United States Patent
Deng et al.

(10) Patent No.: US 11,785,872 B2
(45) Date of Patent: Oct. 17, 2023

(54) CLOSED-LOOP ACTIVELY DAMPED POSITION CONTROL OF AN IMPLEMENT STABILIZER WHEEL

(71) Applicant: CNH Industrial America LLC, New Holland, PA (US)

(72) Inventors: Yong Deng, Peoria, IL (US); Timothy R. Blunier, Danvers, IL (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 941 days.

(21) Appl. No.: 16/227,462

(22) Filed: Dec. 20, 2018

(65) Prior Publication Data

US 2020/0196512 A1 Jun. 25, 2020

(51) Int. Cl.
| | |
|---|---|
| *A01B 63/00* | (2006.01) |
| *A01B 63/22* | (2006.01) |
| *F16F 15/02* | (2006.01) |
| *A01B 79/00* | (2006.01) |
| *A01B 33/16* | (2006.01) |
| *A01C 5/06* | (2006.01) |

(Continued)

(52) U.S. Cl.
CPC ............ *A01B 63/002* (2013.01); *A01B 63/22* (2013.01); *A01B 79/005* (2013.01); *F16F 15/02* (2013.01); *A01B 33/16* (2013.01); *A01B 63/32* (2013.01); *A01C 5/064* (2013.01); *A01C 7/203* (2013.01)

(58) Field of Classification Search
CPC ....... A01B 33/16; A01B 63/002; A01B 63/32; A01B 79/005; F16F 15/02; A01C 7/203
See application file for complete search history.

(56) References Cited

U.S. PATENT DOCUMENTS

| | | | |
|---|---|---|---|
| 3,896,610 A | * | 7/1975 | Hiniker .................. A01D 41/14 56/15.8 |
| 5,609,230 A | | 3/1997 | Swinbanks |

(Continued)

FOREIGN PATENT DOCUMENTS

| | | | |
|---|---|---|---|
| CN | 106961855 A | 7/2017 | |
| DE | 102014203005 B3 | * 5/2015 | ........... A01D 41/127 |
| WO | 00/10377 A1 | 3/2000 | |

OTHER PUBLICATIONS iNavFlight; DigitalEntity; Detect and ignore Accelerometer if Measured Vibration is High; GitHub iNavFlight/inav; Issue #486; Aug. 20, 2016; pp. 1-32; https://github.com/iNavFlight/inav/issues/486.

*Primary Examiner* — Thomas B Will
*Assistant Examiner* — Joel F. Mitchell
(74) *Attorney, Agent, or Firm* — Rebecca Henkel; Rickard DeMille

(57) ABSTRACT

A stabilizer wheel arrangement is actively damped when remotely positioning a stabilizer wheel of a towable agricultural implement by detecting an onset of ground-induced vibration and automatically introducing a phase-shifted vibration-countering or cancelling/damping modulation pattern into a signal that simultaneously and cooperatively controls the flow of hydraulic fluid to and from both the rod and base ends of the bore of a double-acting hydraulic cylinder, to hold the piston of the hydraulic cylinder at a target position determined from a desired position input signal corresponding to a desired position of the stabilizer wheel with respect to a frame of the agricultural implement.

9 Claims, 9 Drawing Sheets

(51) Int. Cl.
*A01B 63/32* (2006.01)
*A01C 7/20* (2006.01)

(56) References Cited

U.S. PATENT DOCUMENTS

| | | | |
|---|---|---|---|
| 6,382,326 B1 * | 5/2002 | Goins et al. | A01B 63/145 |
| | | | 172/239 |
| 6,612,375 B2 | 9/2003 | Rogala | |
| 6,778,894 B2 * | 8/2004 | Beck et al. | A01D 41/127 |
| | | | 701/50 |
| 7,261,176 B2 | 8/2007 | Chun et al. | |
| 7,610,136 B2 | 10/2009 | Okamura et al. | |
| 8,162,070 B2 * | 4/2012 | Smith et al. | G05D 19/02 |
| | | | 172/2 |
| 8,424,832 B2 | 4/2013 | Robbins et al. | |
| 8,869,908 B2 * | 10/2014 | Zhu et al. | E02F 9/265 |
| | | | 172/4.5 |
| 9,162,703 B2 | 10/2015 | Miller et al. | |
| 9,554,504 B2 | 1/2017 | Houck | |
| 9,664,249 B2 * | 5/2017 | Kowalchuk | A01C 7/205 |
| 9,832,926 B2 * | 12/2017 | Jung et al. | A01D 41/127 |
| 9,868,438 B2 * | 1/2018 | Jung et al. | A01B 76/00 |
| 2016/0100517 A1 | 4/2016 | Bassett | |
| 2016/0139003 A1 | 5/2016 | Posselius et al. | |
| 2017/0112043 A1 | 4/2017 | Nair et al. | |
| 2018/0310460 A1 * | 11/2018 | Stovall et al. | A01B 79/005 |

* cited by examiner

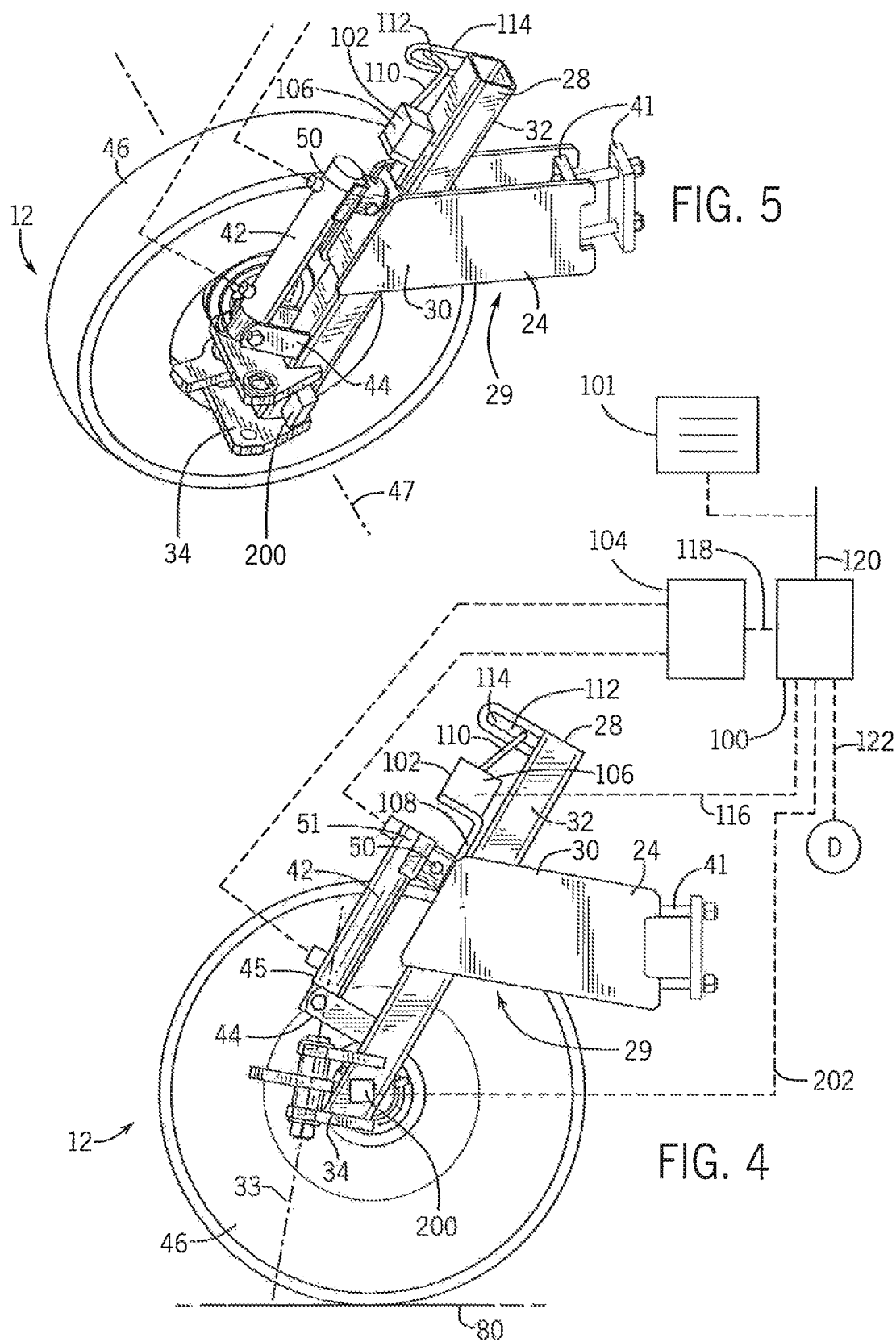

CLOSED-LOOP ACTIVELY DAMPED POSITION CONTROL OF AN IMPLEMENT STABILIZER WHEEL

FIELD OF THE INVENTION

The present invention pertains to towable agricultural implements, such as tillage equipment and other wide implements, towed behind a towing vehicle, such as a tractor, and, more specifically, to actively controlling positioning of stabilizer wheels utilized in such implements during operation of the implement.

BACKGROUND OF THE INVENTION

Modern farming practices often utilize towable agricultural tillage implements to prepare a seedbed providing optimal conditions for subsequent planting of seed in the seedbed, proper germination and growth of the seed, and conservation of the soil in and below the seedbed. Such implements are configured to provide a seedbed having a number of desirable conditions, including a uniform controlled depth, a flat and smooth floor at the bottom of the seedbed, and a relatively even surface finish.

To cover large acreages as quickly and efficiently as possible, modern towable tillage implements, such as disks and field cultivators, are often very wide, with tillage widths of 22 to 47 feet being common. In order to allow such wide implements to be towed behind a towing vehicle on public roadways, these implements typically are built with frames having a central main frame section and multiple wing sections joined to the main frame by hinged joints, so that the wing sections can be folded up over the main frame section to narrow the width of the implement for transport on public roadways. In addition, the frames of such implements are also intentionally built to allow a limited amount of flexing to occur across the width of the implement during tillage operations, so that tillage tools attached to the frame can better follow variations in the terrain of the ground being tilled.

The hinged joints and inherent flexibility between the main and wing sections of the frame of such implements sometimes leads to undesirable bouncing of the wings, or an undesirable tendency of the outer edges of the tillage tools to dig deeper than desired into the ground surface, particularly while turning or maneuvering around obstacles. The wider the implement, the worse this problem becomes.

In order to counteract the tendency of wide tillage implements to undesirably bounce or dig into the ground surface, some tillage implements utilize so-called stabilizer wheels along outer extremities of the implement. These stabilizer wheels ride on or close to the ground surface, to damp any bouncing tendencies, and to provide additional support to preclude having the outer ends of the tillage tools dig too deeply into the ground surface during turning or maneuvering the wide tillage implement around obstacles during tillage operations. To improve maneuverability, such stabilizer wheels are sometimes configured to pivot during turning and maneuvering.

Generally speaking, such stabilizer wheels are properly initially adjusted to bear only lightly on the ground surface, until they come into play for reducing bouncing or digging in of the tillage tools. They do not typically function to provide primary support of the implement or primary depth control for the tillage tools. Primary support and depth control are typically provided by support and transport wheels of the implement. Having the stabilizer wheels properly positioned to bear only lightly on the ground surface typically enhances the ability of pivotable stabilizer wheels to move as desired under forces exerted by the ground surface during turning and maneuvering of the implement.

For proper operation of the implement, it is necessary for the stabilizer wheels to be positioned properly with respect to the implement frame, so that the stabilizer wheels can perform their necessary function without interfering with primary depth control and leveling of the tillage tools fore and aft, and across the width of the implement. If the stabilizer wheels are extended too far, or press too hard against the ground surface, the resulting lifting effect on the implement frame will interfere with proper operation of the tillage tools, and seedbed quality will be degraded. As changes are made to the depth of tillage, therefore, the stabilizer wheels must also be adjusted in a corresponding manner to keep the implement operating optimally.

In addition, it may be desirable to retract the stabilizer wheels during certain tillage operations and under certain operating conditions. It is also typically desirable that the stabilizer wheels be retracted prior to and during initial set up and subsequent adjustments to the operating depth and level or trim condition of the tillage tools. Following such set up and adjustments, the stabilizer wheels must be returned to a proper position and degree of ground pressure.

In the past, positioning of stabilizer wheels has typically been accomplished through the use of manually operated turnbuckles or screw jacks by an operator or an operator's assistant standing on the ground. Alternatively, manually operated hydraulic cylinders have been used to position the stabilizer wheels on some tillage implements.

More recently, automatically remotely controllable hydraulic cylinders have been utilized to position the stabilizer wheels on some tillage implements. Although the introduction of such automated control has provided substantial improvement over traditional manually actuated positioning apparatuses and methods, they have not kept pace with increased needs for accuracy, precision and responsiveness that is desired and needed in positioning the stabilizer wheels of modern tillage equipment.

To fully take advantage of the operational speed and accuracy available in modern tillage equipment, it is desirable to have changes in the position of a stabilizer wheel be incrementally adjustable remotely in very fine increments, allowing very precise and accurate control of the stabilizer wheel position virtually instantaneously to optimize preparation of the seedbed at the high operational speeds at which modern tillage equipment is operated.

Modern tillage practices are typically carried out at ground speeds that are substantially higher than could be utilized in the past. Such higher speeds have been made possible by the advent of more efficient tillage tools, increases in available horsepower of towing vehicles, and other factors such as reduced tillage depth for some operations. The extent to which ground speed can be increased has been limited to some degree, however, by ground-induced vibration and instability of stabilizer wheel arrangements. Forces acting on the stabilizer wheel at higher ground speeds can induce a form of resonant vibration that can cause sections of an implement frame to vibrate in an undesirable fashion that diminishes operational efficiencies and effectiveness of the tillage implement. As a result, ground speed must be limited to a speed at which the resonant vibration is not incurred.

It is desirable, therefore to provide an improved approach to remotely and automatically positioning a stabilizer wheel more precisely, accurately and quickly than prior approaches. It is also desirable to provide such an improved remote positioning approach that includes provisions for damping of potential resonant ground-induced vibration. It is highly desirable to provide such an approach to remotely positioning and damping vibration in an implement stabilizer wheel in a form that can be readily adapted for use with present and older tractors and towing vehicles without monopolizing multiple hydraulic ports and control valves of the towing vehicle, resorting to complex and costly system additions or upgrades, or requiring the use of communication protocols such as the emerging ISOBUS Class 3 which is not currently widely utilized in agricultural equipment.

SUMMARY OF THE INVENTION

The invention provides an apparatus and method for actively damping vibration in a remotely positionable stabilizer wheel of a towable agricultural implement by detecting an onset of ground-induced vibration and automatically introducing a phase-shifted vibration-countering or vibration cancelling/damping modulation pattern into a signal that simultaneously and cooperatively controls the flow of hydraulic fluid to and from both the rod and base ends of the bore of a double-acting hydraulic cylinder, to hold the piston of the hydraulic cylinder at a target position determined from a desired position input signal corresponding to a desired position of the stabilizer wheel with respect to a frame of the agricultural implement. The active damping provided by the present invention allows for operation of the implement at higher ground speeds, thus leading to enhanced operational efficiency and effectiveness of agricultural operations.

The invention also provides an apparatus and a method for remotely positioning a stabilizer wheel of a towable agricultural implement more accurately and precisely than was previously possible, by simultaneously and cooperatively and controlling the flow of hydraulic fluid to and from both the rod and base ends of the bore of a double-acting hydraulic cylinder, to thereby hold the piston of the hydraulic cylinder at a target position determined from a desired position input signal corresponding to a desired position of the stabilizer wheel with respect to a frame of the agricultural implement. Precision and accuracy of positioning the stabilizer wheel are particularly enhanced in forms of the invention employing proportional, or PID control of the double-acting cylinder.

The invention allows multiple stabilizer wheels to be controlled independently from one another and independently from a depth control apparatus of the implement. In applications with multiple stabilizer wheels, the invention allows the stabilizer wheels to be moved in opposite directions at the same time. The invention provides the further advantage of positioning one, or multiple stabilizer wheels using only a single source of pressurized hydraulic fluid operating in a standby mode, without the use of multiple hydraulic control channels of a towing vehicle. The invention further provides a significantly greater degree of accuracy and precision in positioning of stabilizer wheels than was previously achievable.

In one form of the invention, an actively damped remotely positionable stabilizer wheel arrangement is provided for an agricultural tillage implement having an implement frame supported above a ground surface by implement support wheels operatively connected to the frame by a depth control arrangement.

The actively damped remotely positionable stabilizer wheel arrangement includes a stabilizer wheel adapted for engaging the ground surface, a stabilizer wheel positioning arrangement, an electro-hydraulic flow control arrangement, a position sensor, a vibration sensor, and an electrical controller.

The stabilizer wheel positioning arrangement is adapted for operatively connecting the stabilizer wheel to the frame, and it includes a double-acting hydraulic cylinder. The stabilizer wheel positioning arrangement is configured for adjusting engagement of the stabilizer wheel with the ground surface through action of the double-acting hydraulic cylinder.

The electro-hydraulic flow control arrangement is operatively connected in fluid communication with the double-acting cylinder, and it is adapted for receiving a cylinder control electrical signal. The electro-hydraulic flow control arrangement is further adapted for operative connection in fluid communication with a source of pressurized hydraulic fluid for receiving a flow of pressurized hydraulic fluid from the source.

The position sensor is configured and operatively connected for indicating a present position of the stabilizer wheel with respect to the frame, and for generating an electrical present position signal indicative of the present stabilizer wheel position with respect to the frame. The vibration sensor is configured and operatively connected for detecting a present ground-induced vibration of the stabilizer wheel, and for generating an electrical present vibration signal indicative of the vibration of the stabilizer wheel.

The electrical controller is adapted for receiving an input signal indicating a desired position of the stabilizer wheel with respect to the frame, and is operatively connected to the position sensor, the vibration sensor and the electro-hydraulic flow control arrangement.

The double-acting hydraulic cylinder of the stabilizer wheel positioning arrangement has an internal bore divided by a piston into a base end and a rod end of the bore. The cylinder also has first and second ends thereof operatively attached within the wheel positioning arrangement for extension and retraction of the wheel positioning arrangement with respect to the frame by corresponding movement of the piston within the bore of the hydraulic cylinder to thereby position the stabilizer wheel with respect to the frame.

The electro-hydraulic flow control arrangement includes a solenoid-operated flow control valve arrangement operatively connected in fluid communication with both the base end and the rod end of the bore of the hydraulic cylinder and configured for simultaneously and cooperatively controlling the flow of hydraulic fluid to and from both the rod and base ends of the bore of the hydraulic cylinder, to thereby control extension and retraction of the cylinder in accordance with the cylinder control signal.

The controller is operatively connected to the solenoid-operated flow control valve arrangement, and configured for generating and providing the cylinder control signal to the solenoid-operated flow control valve arrangement in response to the present position signal and the desired wheel position signal, to thereby cause the hydraulic cylinder to move the stabilizer wheel to and hold the stabilizer wheel at the desired stabilizer wheel position by simultaneously and cooperatively controlling the flow of pressurized hydraulic fluid to and from both the rod and base ends of the bore of the hydraulic cylinder.

The controller is further configured for monitoring the present vibration signal, detecting an onset of the ground-induced vibration in the stabilizer wheel, and introducing a phase-shifted vibration-countering or vibration cancelling/ damping modulation into the cylinder control signal, to thereby reduce the ground-induced vibration of the stabilizer wheel.

In some forms of the invention, the stabilizer wheel arrangement may include a telescoping support strut and support strut bracket. The support strut may have a first end thereof adapted for mounting the stabilizer wheel thereto and a second end adapted for sliding engagement with the support strut bracket. The support strut bracket may be adapted for attachment to the implement frame and for operative sliding engagement with the second end of the support strut for operatively connecting the support strut to the frame. The double-acting hydraulic cylinder may have a first end thereof operatively attached to the support strut, and a second end thereof operatively attached to the support strut bracket for extension and retraction of the strut with respect to the strut bracket by corresponding extension and retraction of the hydraulic cylinder to thereby lower and raise the stabilizer wheel in to and out of contact with the ground surface. The vibration sensor may be attached to the support strut.

The vibration sensor, in some forms of the invention, may be a device selected from the group of devices consisting of an accelerometer, an inertia measurement unit; a strain gage and a load cell.

A solenoid-operated flow control valve arrangement, according to the invention, may include a solenoid-operated proportional control valve, and the controller may be configured for simultaneously, cooperatively and proportionally controlling the flow of pressurized hydraulic fluid from the solenoid-operated proportional control valve to and from both the rod and base ends of the bore of the hydraulic cylinder.

In some forms of the invention, the controller and position sensor may be operatively connected and configured to form a proportional negative feedback control arrangement for determining a present difference between the desired and present positions of the stabilizer wheel, and may be further configured for adjusting the flow of hydraulic fluid to and from the rod and cylinder ends of the bore of the cylinder in proportion to the determined present difference between the desired and present positions of the stabilizer wheel. The position sensor may be further operatively connected for indicating a present position of the piston within the cylinder bore that corresponds to a present position of the stabilizer wheel with respect to the frame. The position sensor may also be configured for generating an electrical signal indicative of the present position of the piston within the cylinder bore. The controller may be configured for: determining a target position of the piston within the cylinder bore corresponding to the desired wheel position input signal; determining a present difference between the target and present positions of the piston within the cylinder bore; and for adjusting the flow of hydraulic fluid to and from the rod and cylinder ends of the bore of the cylinder in proportion to the determined present difference between the target and present positions of the piston in the cylinder bore, to thereby move and hold the piston at the target position for the piston within the cylinder bore. The controller may also be configured to repetitively sample the present difference between the target and present positions of the piston within the bore of the cylinder at a periodic rate, and to command the proportional control valve to simultaneously and cooperatively adjust the flow of pressurized hydraulic fluid to and from both the rod and base ends of the bore of the hydraulic cylinder at the periodic rate.

A controller, according to the invention, may be configured for: determining a present magnitude of the ground-induced vibration; comparing the present magnitude of the ground-induced vibration to a desired maximum allowable magnitude of ground-induced vibration; and introducing the phase-shifted vibration-countering or vibration cancelling/damping modulation pattern into the cylinder control signal whenever the present magnitude of the ground-induced vibration exceeds the maximum allowable magnitude of ground-induced vibration.

In some forms of the invention, the controller may be further configured for determining a frequency and phase of the ground-induced vibration, and for generating the phase-shifted vibration-countering or vibration cancelling/damping modulation pattern in response to the frequency, phase and magnitude of the ground-induced vibration. The controller may also be configured for generating the phase-shifted vibration-countering or vibration cancelling/damping modulation pattern by a process including at least one step from the group of the steps consisting of: (a) selecting a predetermined modulating pattern corresponding to the frequency, phase and magnitude of the ground-induced vibration; (b) computing a modulating pattern corresponding to the frequency, phase and magnitude of the ground-induced vibration; and, (c) making an incremental adjustment, which may be a recursive adjustment, to a previously generated modulating pattern corresponding to the frequency, phase and magnitude of the ground-induced vibration.

The invention may take the form of an agricultural tillage implement, or a method that includes an actively damped remotely adjustable stabilizer wheel arrangement, according to the invention.

An agricultural tillage implement according to the invention may have an implement frame supported above a ground surface by implement support wheels operatively connected to the frame by a depth control arrangement, and at least one actively-damped stabilizer wheel arrangement according to the invention operatively attached to the frame. The position and the degree of active vibration damping applied may be adjusted independently for each stabilizer wheel. The position of each stabilizer wheel of the implement may be adjustable independently from the implement support wheels and the depth control arrangement. Some forms of an agricultural tillage implement according to the invention may include at least two actively-damped remotely positionable stabilizer wheel arrangements operatively attached to the frame and configured for adjustment independently from one another.

The invention may take the form of a method for actively damping a ground-induced vibration in a remotely positioning a stabilizer wheel of an agricultural tillage implement having an implement frame supported above a ground surface by implement support wheels operatively connected to the frame by a depth control arrangement, in accordance with a desired position of the stabilizer wheel with respect to the frame.

One form of a such a method may include: positioning the stabilizer wheel with respect to the frame at a present position in accordance with the desired position of the stabilizer wheel; detecting an onset of the ground-induced vibration in the stabilizer wheel; and, modulating the present position of the stabilizer wheel in accordance with a phase-shifted vibration-countering or vibration cancelling/damping modulation pattern, to thereby reduce the ground-induced vibration of the stabilizer wheel.

A method may include the steps of: operatively connecting the stabilizer wheel to the frame with a stabilizer wheel positioning arrangement including a double-acting hydraulic cylinder having an internal cylinder bore divided by a piston into a base end and a rod end of the bore, the cylinder also having first and second ends thereof operatively attached within the wheel positioning arrangement for extension and retraction of the wheel positioning arrangement with respect to the frame by corresponding movement of the piston within the bore of the hydraulic cylinder to thereby position the stabilizer wheel with respect to the frame; determining a target position for the piston within the cylinder bore that corresponds to the desired position of the stabilizer wheel with respect to the frame; simultaneously and cooperatively controlling the flow of hydraulic fluid to and from both the rod and base ends of the bore of the hydraulic cylinder to thereby control extension and retraction of the cylinder for moving the stabilizer wheel to, and holding the stabilizer wheel at, the desired stabilizer wheel position; and, modulating the flow of hydraulic fluid according to a phase-shifted vibration-countering or vibration cancelling/damping modulation pattern, to thereby modulate the position of the piston within the cylinder bore about the target position of the piston.

Some forms of a method, according to the invention, may also include determining a frequency, phase and magnitude of the ground-induced vibration, and generating the phase-shifted vibration-countering or vibration cancelling/damping modulation pattern in response to the frequency, phase and magnitude of the ground-induced vibration.

A method according to the invention may further include determining the phase-shifted vibration-countering or vibration cancelling/damping modulation pattern by a process including at least one step from the group of the steps consisting of: selecting a predetermined modulating pattern corresponding to the frequency, phase and magnitude of the ground-induced vibration; computing a modulating pattern corresponding to the frequency, phase and magnitude of the ground-induced vibration; and, making an incremental adjustment, which may be a recursive adjustment, to a previously generated modulating pattern corresponding to the frequency, phase and magnitude of the ground-induced vibration.

Other aspects, objects and advantages of the invention will be apparent from the following detailed description and accompanying drawings.

BRIEF DESCRIPTION OF THE DRAWINGS

For the purposes of illustration, there are shown in the drawings certain embodiments of the present invention. It should be understood, however, that the invention is not limited to the precise arrangements, dimensions, and instruments shown. Like numerals indicate like elements throughout the drawings. In the drawings:

FIG. 4 illustrates a partly schematic orthographic side view of a left actively-damped remotely positionable stabilizer wheel arrangement, as viewed from the left front corner of FIG. 1, with a hitch of the implement for attachment to a towing vehicle defining the front of the implement, and left and right sides of the implement being as viewed by a person standing at the rear of the implement looking forward toward the hitch, in accordance with an exemplary embodiment of the present invention;

FIG. 5 illustrates an isometric view of a portion of an actively-damped remotely controllable stabilizer wheel arrangement of FIG. 4, in accordance with an exemplary embodiment of the present invention;

DETAILED DESCRIPTION OF THE INVENTION

Figure 1:
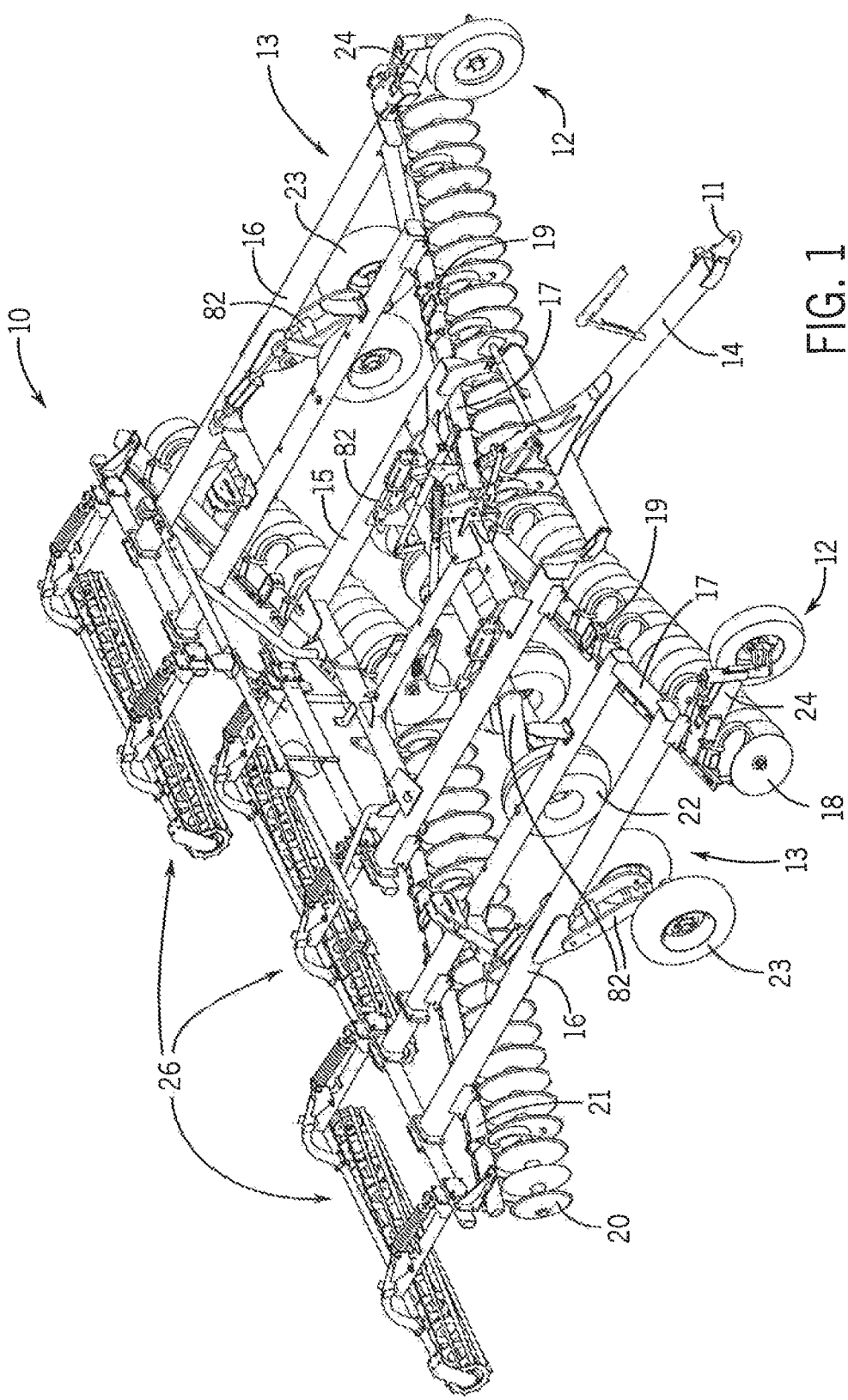
FIG. 1 illustrates an isometric view of an exemplary embodiment of a towable agricultural tillage implement, the towable agricultural tillage implement including multiple actively-damped remotely controllable stabilizer wheel arrangements, in accordance with an exemplary embodiment of the present invention.

FIG. 1 shows an exemplary embodiment of a towable agricultural implement, according to the invention, in the form of a tandem disk 10, including a pair of left and right actively-damped remotely adjustable stabilizer wheel arrangements 12,12. The disk 10 includes a hitch 14, which has a distal end 11 that is adapted for operative attachment to a towing vehicle, such as a tractor. The disk 10 has a frame 16 that includes a pair of left and right floating wings 13,13 connected to a central main section 15 of the frame 16 by a plurality of hinged joints 19. The disk 10 also includes segmented front and rear tillage tools, in the form of front and rear disk gangs 18, 20, that are operatively joined to the frame 16 by front and rear segmented tool bars 17,21 respectively. The tool bars 17,21 and disk gangs 18,20 are segmented and attached to the main frame 16 and wing frames 13,13 in a manner that allows the wing frames 13,13 and the segments of the front and rear disk gangs 18,20 to be folded above the center section 15 of the frame 16, to thereby narrow the disk 10 for transport on public roadways.

Figure 2:
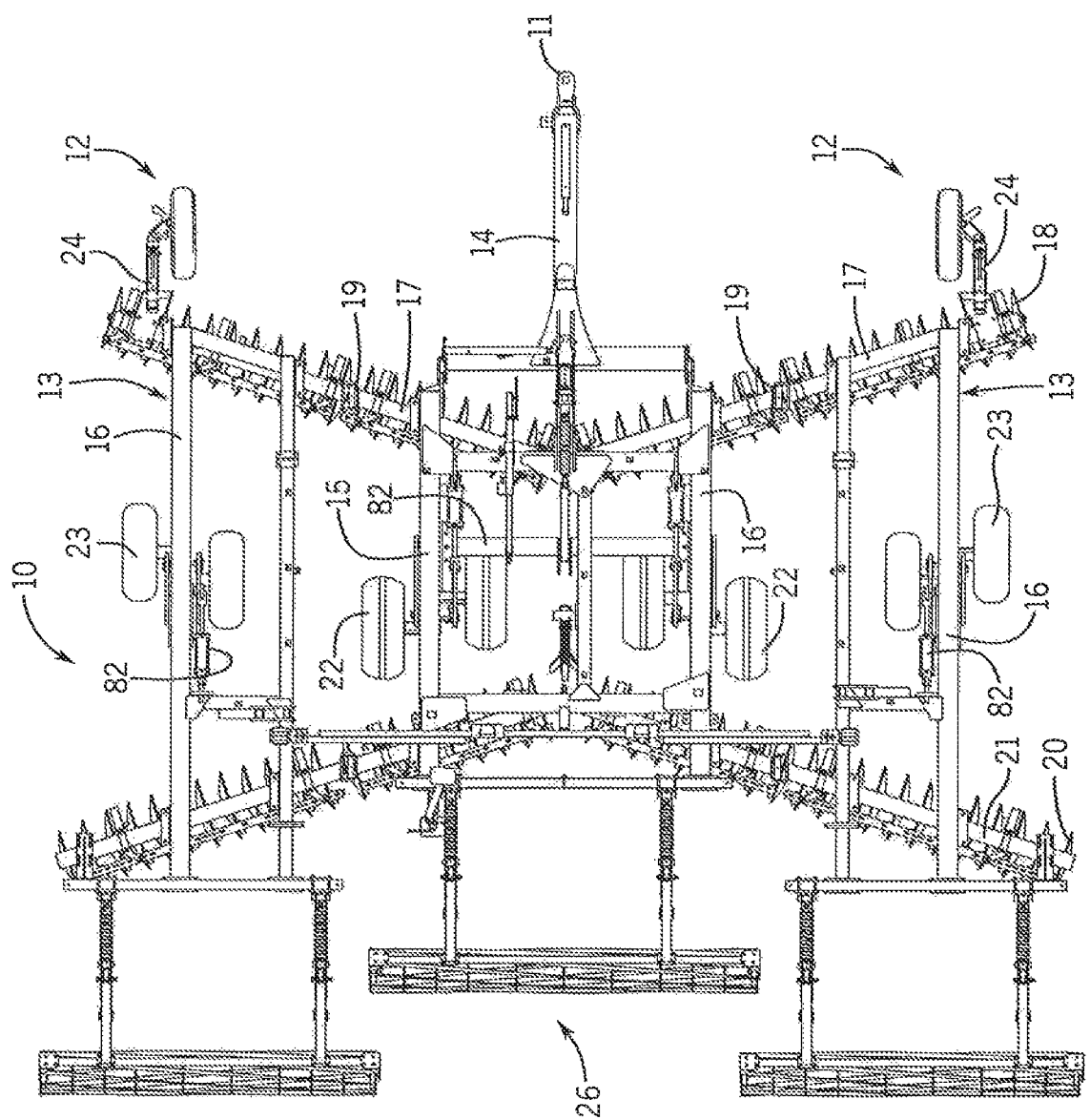
FIG. 2 illustrates an orthographic top view the implement of FIG. 1, in accordance with an exemplary embodiment of the present invention.
Figure 3:
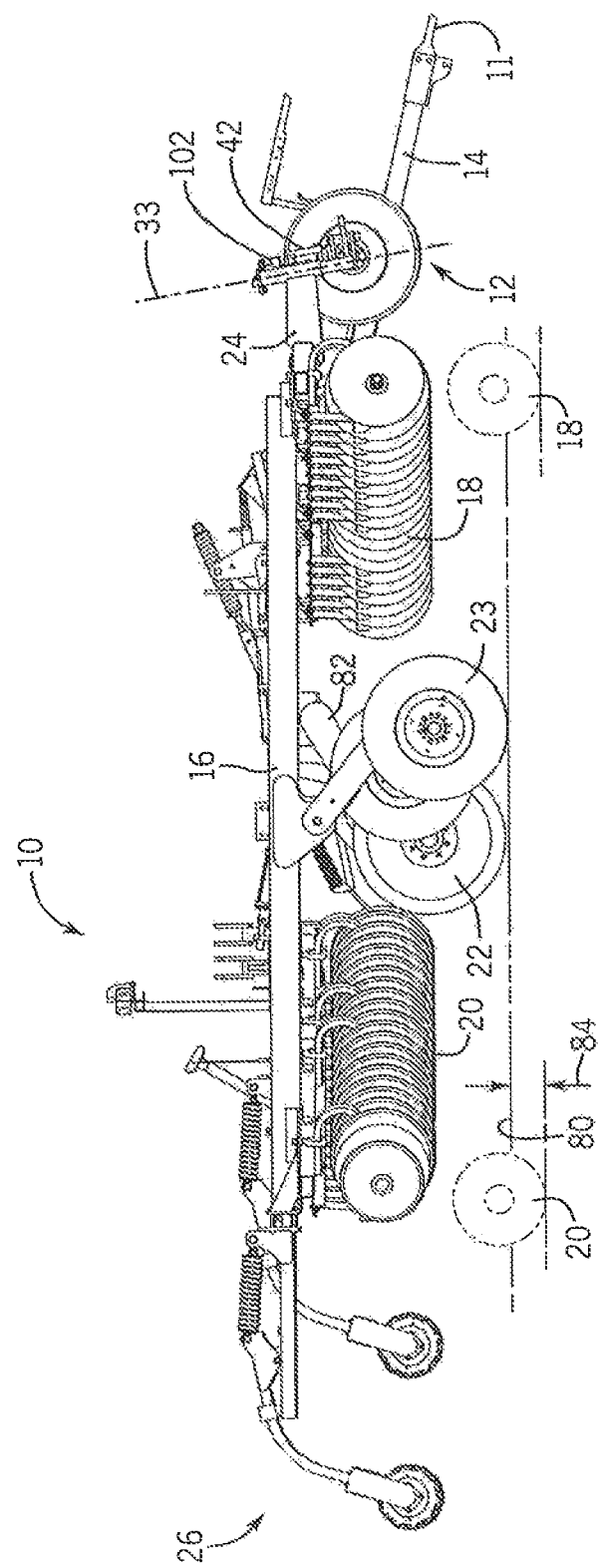
FIG. 3 illustrates an orthographic side view of the implement of FIG. 1, showing the implement in a raised position for field transport, with stabilizer wheels and tillage tools of the implement raised off of the ground, in accordance with an exemplary embodiment of the present invention.

As shown in FIGS. 1-3, the disk 10 is supported above a ground surface 80 by two pairs of tandem support wheels 22,22, and right and left pairs of wing frame support wheels 23,23. The pairs of support and wing frame wheels 22,22, 23,23 are all operatively attached to the frame 16 by a common depth control arrangement 82, in a manner that allows the depth control arrangement 82 to set and maintain a depth of penetration 84 of the tillage tools 18,20 below the ground surface 80, in the manner known in the art, and as indicated schematically in FIG. 3.

Specifically, the depth control arrangement 82 is configured such that, when the wing frames 13 are lowered, as shown in FIGS. 1-3, the support wheels 22,22 and wing frame wheels 23,23 all act together to support the disk 10 above the ground surface 80. In FIG. 3, the disk 10 is shown in a raised, field transport condition, where the wheels 22,22,23,23 and depth control arrangement 82 have lifted the disk gangs 18,20 out of contact with the ground surface 80. When the wing frames 13 are lowered to a working configuration, as shown in FIGS. 1-3, and the depth control arrangement 82 is commanded to lower the disk 10 to a working position, the front and rear gangs 18,20 of tillage tools will penetrate the ground surface 80 to the depth of penetration 84, as indicated by dashed lines in FIG. 3.

The disk 10 and depth control arrangement 82 are further configured such that, when the wing frames 13,13 are raised above the main frame 15 to narrow the disk 10 for towing on a public roadway, a part of the depth control arrangement 82 attaching the transport wheels 22,22 to the main frame 15 is utilized to raise the disk 10 to a transport position, which is not illustrated in the drawings, in a manner known in the art.

As shown in FIGS. 1-3, the exemplary embodiment of the disk 10 also includes surface finishing tools, in the form rotating crumblers 26 operatively attached to the rear of the disk 10.

As best seen in FIGS. 1 and 2, the disk 10 includes two actively-damped remotely adjustable left and right stabilizer wheel arrangements 12,12 which are respectively located near the left and right front extremities of front tool bar 17. In various embodiments of the invention, the actively-damped stabilizer wheel arrangements 12,12 may be operatively attached directly to the main frame 15 or wing frames 13 of the frame 16, or alternatively attached to the front tool bar 17

As discussed above, the main frame 15 and wing frames 13,13 are joined together by a plurality of hinged connections 19, that allow the wing frames 13,13 to be folded above the main frame 15. The disk 10 is further configured to utilize these hinged connections 19 in a manner that allows the wing frames 13,13 to flex with respect to the main frame 15, so that the disk gangs 18,20 can better follow the terrain and conform to the ground surface 80, as the disk 10 is towed across the ground surface 80 during tillage operations. This flexibility of the disk frame 16, together with the extensive width of modern tillage implements (22 to 47 feet of width being commonplace) can cause the wings 13,13 to bounce, under certain tillage conditions, and also contribute to the outer corners of the front disk gangs 18,20 undesirably digging too deeply into the ground surface 80, during turning or maneuvering the disk 10 around an obstacle. Accordingly, the actively-damped remotely positionable stabilizer wheel arrangements 12,12 of the exemplary embodiment of the disk 10 are advantageously attached to the wing frames 13,13, or the front tool bar 17 near the front left and right front corners of the disk 10. Positioning the stabilizer wheel arrangements 12,12 in this manner maximizes their effectiveness in damping out wing bounce and/or undesirable digging-in of the front disk gang 18.

With regard to positioning, the actively-damped stabilizer wheel arrangements 12,12 are properly adjusted to maintain only light contact pressure with the ground surface 80, until they come into operation due to a change in the terrain, so as to not interfere with operation of the depth control arrangement 82 and support and transport wheels 23,23,22, 22 in maintaining a desired depth of penetration 84 of the front and rear disk gangs 18,20 below the ground surface 80. The stabilizer wheel arrangements 12,12 of the exemplary embodiment are also pivotable by interaction with the ground surface 80, to enhance overall maneuverability and operation of the disk 10. Having a light contact pressure aids in proper pivoting motion of the wheel arrangements 12,12.

FIGS. 4-7 illustrate an exemplary embodiment of the actively-damped remotely hydraulically positionable stabilizer wheels 12, 12, of the exemplary embodiment of the disk 10. The left and right stabilizer wheel arrangements 12,12 of the exemplary embodiments described herein are left and right-hand assemblies of identical groupings of component parts.

FIGS. 4 and 5 show the left front actively-damped remotely positionable stabilizer wheel arrangement 12 of the disk 10. The exemplary embodiment of the stabilizer wheel arrangement 12 includes a support strut 28, a support strut bracket 24, a stabilizer wheel 46, a double-acting hydraulic cylinder 42, an electro-hydraulic control arrangement 104, a stabilizer wheel position sensor 102, a vibration sensor 200 and an electronic control unit or electrical controller, shown as controller 100. The support strut 28, the support strut bracket 24 and the double-acting cylinder 42 are part of a stabilizer wheel positioning arrangement 29, that is adapted and configured for adjustably connecting the stabilizer wheel 46 to the frame 16, in a manner described in more detail below.

The support strut 28 has a first, lower, end 34 thereof adapted for mounting the stabilizer wheel 46 to the support strut 28 in a manner that allows the stabilizer wheel 46 to roll about a substantially horizontal rotational axis 47 when the stabilizer wheel 46 is in contact with the ground surface 80. The lower end of the support strut 28 is configured to form a pivot bracket 34, and it is connected to the stabilizer wheel 46 in a manner that allows the wheel 46 to pivot to a limited degree about a pivot axis 33 that extends in a generally up and down, non-horizontal direction, to thereby facilitate pivoting of the stabilizer wheel 46 and maneuverability of the disk 10.

The support strut bracket 24 has a first end 41 thereof adapted for attachment to the implement frame 16, or the front tool bar 17. In the embodiments shown in FIGS. 4-5 and 8-9, the first end 41 of the support strut bracket is configured as a bolt-on clamping arrangement. In other embodiments, the first end 41 of the support strut bracket 24 may be configured for attachment by any appropriate method, such as a through a bolting flange or by welding. The second, distal, end 30 of the support strut bracket 24 is configured for slidable engagement with a second end 32 of the support strut 28, in a manner allowing the stabilizer wheel 46 to alternatively be lowered into contact the ground surface 80, or raised out of contact with the ground surface 80.

A first, lower, end 45 of the hydraulic cylinder 42 is operatively attached to a pair of ears 44 of the pivot bracket 34 at the lower end of the support strut 28 by a pivoting pin or bolted connection. The other, upper, end thereof of the hydraulic cylinder 42 is operatively attached through a pivotable pinned or bolted connection to a second pair of ears 50 fixedly attached to the second end 30 of the support strut bracket 24. By virtue of this arrangement, the support strut 28 can be extended or retracted with respect to the strut bracket 24 by corresponding extension and retraction of the hydraulic cylinder 42, to thereby respectively lower and raise the stabilizer wheel 46 into, and out of contact with the ground surface 80.

As shown in FIGS. 4 and 5, the position sensor 102, of the remotely positionable stabilizer wheel arrangement 12 is operatively connected between the strut 28 and the strut bracket 24 for indicating a present linear position of the strut 28 with respect to the strut bracket 24, and for generating an electrical signal 116 that is indicative of a present position of the stabilizer wheel 46 with respect to the strut bracket 24. In the embodiment shown in FIGS. 4 and 5, the position sensor 102 is a rotary potentiometer, having a body 106 attached to a sensor mounting bracket 108 that extends upward from and is fixedly attached to the second end 30 of the support strut bracket 24. The rotary potentiometer 102 has a rotatable arm 110 thereof, that slidingly engages an elongated slot 112 in a guide bracket 114 that is affixed to the upper end 32 of the strut 28, in such a manner that linear movement of the strut 28 with respect to the strut bracket 24 is translated into rotation of the arm 110 of the potentiometer 102 with respect to the body of potentiometer 102, to thereby cause the potentiometer 102 to generate the electrical signal 116 indicating a present position of the stabilizer wheel 46 with respect to the strut bracket 24.

It will be appreciated that once the present position of the stabilizer wheel 46 with respect to the strut bracket 24 is known, it is a matter of straightforward geometric calculation, using the dimensions of the disk 10 and the current depth of penetration being held by the depth control arrangement 82, to also determine contact, or lack of contact, of the stabilizer wheel 46 with the ground surface 80. It will also be appreciated that, in other embodiments of the invention, the position sensor 102 may take a variety of different forms, and it may utilize sensing elements other than a rotary potentiometer. For example, it is contemplated that other embodiments of the invention may utilize some form of a linear position sensor operatively connected between the strut 28 and the strut bracket 24, or a Hall-effect or other type of cylinder rod extension sensor 103 (see FIGS. 6 and 7) built into the hydraulic cylinder 42.

As illustrated schematically in FIG. 4, the hydraulic control arrangement 104 is operatively connected to the hydraulic cylinder 42 for controlling extension and retraction of the cylinder 42 in response to cylinder control rod-end and base-end electrical signals 118,119 received from the electronic control unit or controller 100. It is contemplated that the hydraulic control arrangement 104 may take the form of any suitable electrically controlled source of hydraulic power, available as a part of the disk 10 or in the towing vehicle. The invention provides a particular advantage, however, when the controller 100 is mounted on the implement 10, in that interconnections and communication between the towing vehicle and the disk are simplified to the point that more complex communication and controls such as ISOBUS Class 3 are not required.

As further illustrated schematically in FIG. 4, the electronic control unit or controller 100, of the actively-damped remotely positionable stabilizer wheel arrangement 12, is further operatively connected to the position sensor 102 to receive the present stabilizer wheel position signal 116 from the position sensor 102. As further illustrated schematically in FIG. 4, the controller 100 is configured to also receive a desired stabilizer wheel position input 120 from an external source, such as a command from an operator of the towing vehicle, inputted through a touchscreen 101 or other input device located in the cab of the towing vehicle. The controller 100 is internally configured for providing the cylinder control electrical signals 118,119 to the hydraulic control arrangement 104, to thereby cause the hydraulic cylinder 42 to move the stabilizer wheel 46 to, and hold the stabilizer wheel 46 at a present stabilizer wheel position, as indicated by the position signal 116 generated by the position sensor 102, that is equal to the desired stabilizer wheel position input 120 received from the external source, or operator input.

In some forms of an actively-damped remotely positionable stabilizer wheel arrangement 12, according to the invention, the controller 100 selects a predetermined stabilizer wheel position, stored in memory of the controller 100, corresponding to the desired stabilizer wheel position input 120 and controls the hydraulic control arrangement 104 using the predetermined stabilizer wheel position. In other forms of the invention, the controller 100 may calculate a computed desired stabilized wheel position corresponding to the desired stabilizer wheel position input 120, and it may control the hydraulic control arrangement 104 using the computed desired stabilizer wheel position. For example, where the control input 120 calls for desired extension of 24 inches of the stabilizer wheel 46 with respect to the strut bracket 24, the electronic control unit will either look up a desired extension position signal 116 stored in memory, or calculate a desired present position signal 116, and then issue appropriate commands 118,119 to the hydraulic power supply 104 to cause the hydraulic cylinder 42 to drive the stabilizer wheel 46 to, and hold the stabilizer wheel 46 at a position of 24 inches, whereat the present position signal 116 matches the desired position signal 120. If a new desired position input of 23 inches is provided, the above processes would be repeated to position the stabilizer wheel 46 at the new position desired present position of 23 inches.

In some forms of the invention, the electronic control unit may be configured to position the stabilizer wheel 46 in response to a desired stabilizer wheel position input signal 120 calling for a recursive adjustment or an incremental adjustment to a previous desired stabilizer wheel position. For example, where the remotely positionable stabilizer wheel 46 is currently operating at extension distance of 24 inches from the strut bracket 24, the input signal 120 may call for the extension distance to be increased by ½ inch from the present position, causing the controller 100 to calculate a new desired extension position of the stabilizer wheel at 24½ inches from the strut bracket 24, and control the hydraulic power unit 104 to drive the stabilizer wheel 46 to, and hold the stabilizer wheel 46 at an extension of 24½ inches.

As illustrated schematically in FIG. 4, in some forms of an actively-damped remotely positionable stabilizer wheel arrangement 12, according to the invention, the controller 100 may be yet further configured for receiving a desired depth electrical signal 122 and computing a computed desired position of the stabilizer wheel 46, and for providing a cylinder control signal 118 corresponding to the computed desired position of the stabilized wheel to the hydraulic power unit 104, to thereby cause the hydraulic cylinder 42 to move the stabilizer wheel 46 to, and hold the stabilizer wheel 46 at the computed desired stabilizer wheel position corresponding to the desired depth signal 122. The controller 100 may be configured for selecting a predetermined stabilizer wheel position corresponding to the desired depth electrical signal 122, and for controlling the hydraulic control arrangement 104 using the selected predetermined stabilizer wheel position. In some forms of the invention, the controller 100 may calculate a computed desired stabilizer wheel position corresponding to the desired depth input 122, and it may control the hydraulic control arrangement 104 using the computed desired stabilizer wheel position. The desired depth input 122 may indicate the desire to make an incremental adjustment and/or recursive adjustment to a previous desired depth of penetration 84, in some embodiments of the invention.

In embodiments of the invention utilizing a desired depth signal 122, it is contemplated that the desired depth signal 122 may be an input from a source such as an operator of the towing vehicle, or may alternatively, in some embodiments of the invention, be generated from sensors operating as part of a depth control arrangement 82, or otherwise incorporated into an embodiment of a towable tillage implement 10 according to the invention.

As indicated above, in the exemplary embodiment of the disk 10, in both the left and right actively-damped remotely controllable stabilizer wheel arrangements 12,12, the first end 34 of the stabilizer wheel strut 28 is configured as a pivot bracket 34 for operatively connecting the stabilizer wheel 46 to the strut 28. The pivot bracket 34 defines a substantially horizontally extending rolling axis 47 of the stabilizer wheel 46, and also defines a non-horizontal pivot axis 33 of the stabilizer wheel 46, in such a manner that the stabilizer wheel 46 can simultaneously rotate about the rolling axis 47 and pivot about the pivot axis 33, to thereby facilitate maneuvering of the disk 10.

Figure 6:
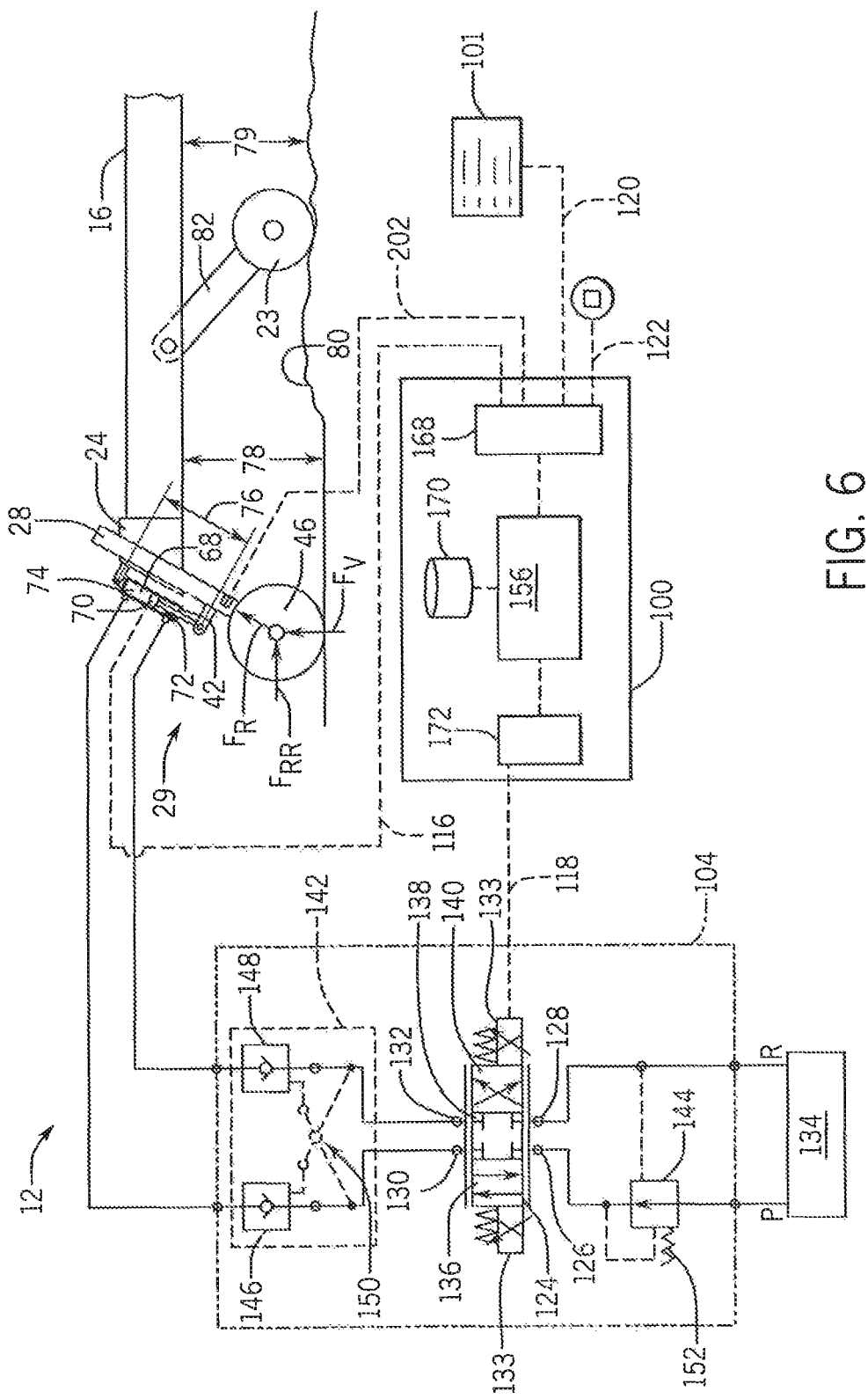
FIG. 6 illustrates a schematic view showing salient aspects of the configuration, interconnection and operation of a control unit and a flow control arrangement of the actively-damped remotely positionable stabilizer wheel arrangement of FIGS. 4 and 5, in accordance with an exemplary embodiment of the present invention.
Figure 7:
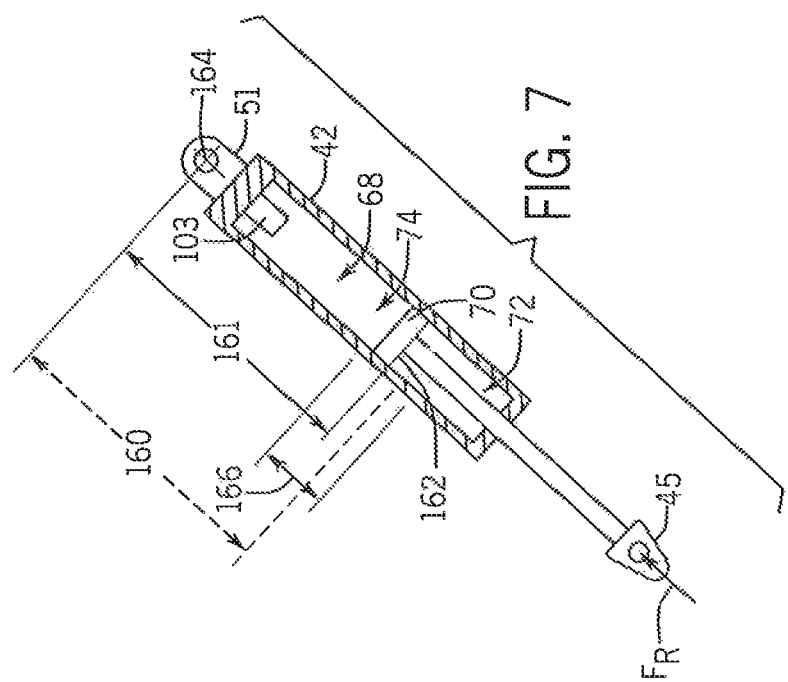
FIG. 7 illustrates an enlarged, cross-sectional view of a hydraulic cylinder of the actively-damped remotely positionable stabilizer wheel arrangement of FIGS. 4-6, in accordance with an exemplary embodiment of the present invention.

As shown in FIGS. 6 and 7, the hydraulic cylinder 42 of the exemplary embodiment is a double-acting hydraulic cylinder 42 having an internal bore 68 that is divided by a piston 70 into a rod end 72 and a base end 74 of the bore 68. The cylinder 42 also has a first end 45 thereof operatively attached to the support strut 28, and a second end 51 thereof operatively attached to the support strut bracket 24 for extension and retraction of the strut 28 with respect to the strut bracket 24 by corresponding extension and retraction of the hydraulic cylinder 42 to thereby lower and raise the stabilizer wheel 46 into and out of contact with the ground surface 80.

As will be understood from an examination of FIGS. 4-6, in light of the description above, the position sensor 102 (or 103) is operatively connected for indicating a present linear extension 76 of the cylinder 42, which is directly proportional to the position of the strut 28 and stabilizer wheel 46 with respect to the strut bracket 24, and generates an electrical signal 116 indicative of a present stabilizer wheel position 78 with respect to the frame 16. When the stabilizer wheel 46 is engaging the ground surface 80, the present stabilizer wheel position 78 is essentially equal to the distance from the strut bracket 24 to the ground surface 80. Furthermore, because the strut bracket 24 is fixedly attached to the frame 16, the electrical signal 116 is also representative of the present position of the stabilizer wheel 46 with respect to the frame 16.

As shown in FIGS. 4-7, the hydraulic control arrangement 104 is operatively connected to both the base end 74 and the rod end 72 of the bore 68 of the hydraulic cylinder 42 for controlling extension and retraction of the cylinder 42 in response to a cylinder control electrical signal 118.

In the embodiment shown in FIG. 5, the controller 100 is operatively connected to the position sensor 102 and to the hydraulic control arrangement 104, to receive the present position signal 116 from the position sensor 102 and a desired stabilizer wheel position input 120.

In the embodiments shown in FIGS. 6 and 7, the cylinder 42 includes an internal position sensor 103 that is used instead of the position sensor 102, for detecting the present position 160 of the piston 70 in the bore 68 of the cylinder 42 and generating the present position signal 116.

In some embodiments of the invention, the desired stabilizer wheel position input 120 is used by the controller 100 to select or compute a target stabilizer wheel position 78, or a desired cylinder extension position 76.

As indicated in FIG. 7, in other embodiments of the invention, the desired stabilizer wheel position may 78 or cylinder extension 76 may constitute a desired target position 160 for a feature such as the rod end face 162 of the piston 160 within the bore 68 of the cylinder 42, for use by the controller 100 in positioning and holding the stabilizer wheel 46 at a desired target position 160, as monitored by the position sensor 103 within the cylinder 42, or by another appropriate position sensor.

The controller 100 is further configured for providing the cylinder control electrical signal 118 to the hydraulic control arrangement 104, to thereby cause the hydraulic cylinder 42 to move the stabilizer wheel 46, and to hold the stabilizer wheel 46 at the target position equating to the desired stabilizer wheel position 78. The controller 100 may also be configured for commanding the hydraulic control arrangement 104 to move the piston 70 in the cylinder bore 68 any time that the present position 161 of the piston deviates from the target position 160 by an amount greater than a predetermined tolerance band 166 centered about the desired target position 160.

In the exemplary embodiment of the disk 10, the controller 100 is configured to hold the stabilizer wheel 46 at the selected or computed target position 160 by simultaneously, cooperatively and proportionally controlling flow in to and out of both the rod and base ends 72,74 of the bore 68 of the hydraulic cylinder 42.

As shown in FIG. 6, a flow control arrangement shown as the hydraulic control unit in the exemplary embodiment of the disk 10 takes the form of an electro-hydraulic proportional flow control arrangement 104 that includes a solenoid-operated proportional flow control valve 124 operatively connected in fluid communication with both the base end 74 and the rod end 72 of the bore 68, of the hydraulic cylinder 42. As described in more detail below, the solenoid-operated proportional flow control valve 124 is configured for simultaneously and cooperatively controlling the flow of hydraulic fluid to and from both the rod and base ends 72,74 of the bore of 68 the hydraulic cylinder 42, to thereby control extension and retraction of the cylinder 42 in accordance with the cylinder control signal 118.

With continued reference to FIG. 6, the solenoid-operated proportional flow control valve 124 of the exemplary embodiment includes an inlet port 126, a return port 128, first and second cylinder ports 130,132, and an electrical solenoid 133 that is configured and operatively connected to the controller 100 for receiving the cylinder control signal 118 and controlling a flow of pressurized hydraulic fluid through the proportional flow control valve 124 in accordance with the cylinder control signal 118. The inlet and outlet ports 126,128 may be adapted for operative connection in fluid communication to a source 134 of pressurized hydraulic fluid, such as a hydraulic fluid supply channel of a tractor or other towing vehicle, for respectively receiving a flow of pressurized hydraulic fluid from the source 134 of pressurized hydraulic fluid and returning the flow of pressurized hydraulic fluid to the source 134 of pressurized hydraulic fluid 134. The first and second cylinder ports 130,132 are operatively connected in fluid communication with the base and rod ends 74,72 respectively of the hydraulic cylinder 42.

The solenoid-operated proportional flow control valve 124 of the exemplary embodiment is a four-way, three-position, solenoid-controlled valve having a straight-through-flow first position 136, a blocked-flow second position 138, and a cross-flow third position 140 that are alternatively selectable by operation of the solenoid 133.

As further illustrated in FIG. 6, the electro-hydraulic proportional flow control arrangement 104 of the exemplary embodiment also includes a double pilot-operated check valve arrangement 142, and a pressure-sensitive control valve 144.

The double pilot-operated check valve arrangement 142 is operatively connected in fluid communication across the rod and base ends 72,74 of the cylinder 42 at a location between the cylinder 42 and the solenoid-operated proportional flow control valve 124. As indicated by the valve schematic in FIG. 6, the double pilot-operated check valve arrangement 142 includes first and second check valve elements 146,148.

The first check valve element 146 is configured and operatively disposed in fluid communication to block flow out of the base end 74 of the cylinder 42 whenever the proportional control valve 124 is in its second position 138. In similar fashion, whenever the proportional control valve 124 is in its second position 138 and blocking flow to either the rod or base ends 72,74 of the cylinder 42 the second check valve element 148 is configured and operatively disposed in fluid communication to block flow out of the rod end 72 of the cylinder 42. As a result, whenever the proportional control valve 124 is in its second position 138 and blocking flow to either the rod or base ends 72,74 of the cylinder 42, the first and second check valve elements 146,148 of the double pilot-operated check valve arrangement 142 remain seated and serve to substantially block flow from entering or exiting from the cylinder 42, thereby locking the cylinder 42 in place.

When the solenoid 133 moves the solenoid-operated flow control valve 124 to either of its first or third positions 136,140, pressure is applied to one or the other of the first and second check valve elements 146,148. The check valve element 146,148 receiving the pressurized fluid will open and allow fluid flow to the cylinder 42. As pressure builds on the open check valve element, a cross-connected internal pilot mechanism 150 within the double pilot-operated check valve arrangement 142 directs pressure to the other check valve element, causing the other check valve element to open and allow return flow out of the cylinder 42 to the source 134 of pressurized hydraulic fluid.

As further shown in FIG. 6, the pressure-sensitive control valve 144 of the exemplary embodiment is operatively connected in fluid communication across the inlet and outlet ports 126,128 of the solenoid-operated proportional flow control valve 124, at a location between the solenoid-operated proportional flow control valve 124 and the source of hydraulic fluid 134, and is configured for providing a constant flow rate of hydraulic fluid to the solenoid-operated proportional flow control valve 124 at varying pressure differences between the inlet and outlet ports 126,128 of the solenoid-operated proportional flow control valve 124.

The pressure-sensitive control valve 144 of the exemplary embodiment is configured such that anytime the pressure at the inlet port 126 of the solenoid-operated proportional flow control valve 124 exceeds the sum of the pressure at the outlet port 128 of the solenoid-operated proportional flow control valve 124 and a pre-selected bias pressure exerted by a spring 152 of the pressure-sensitive control valve 144, the valve 144 begins to open and allow a portion of the inlet pressure and flow to short-circuit back to the source of pressurized fluid 134, to thereby stabilize flow through the solenoid-operated proportional flow control valve 124.

As will be understood and appreciated by those having skill, from the description of exemplary embodiments herein, practice of the invention provides an apparatus and method for positioning one or multiple actively-damped stabilizer wheels 46 while using only a single source of pressurized hydraulic fluid 134 operating in a standby mode, rather than requiring multiple hydraulic control channels of a towing vehicle. A remotely positionable stabilizer wheel arrangement 12, according to the invention is essentially self-contained, with regard to the hydraulic system, and does not rely on any control valves within the towing vehicle for positioning or actively damping the vibration of a stabilizer wheel 46 with respect to the frame 16 of the implement 10. In addition, advanced control methodologies such as the emerging ISOBUS Class 3 are not required.

As yet further shown in FIG. 6, the controller 100 includes a processor 156 operatively connected in communication with an upstream input/output (I/O) interface 168, a data storage device 170, and an output signal conditioning interface 172. The upstream I/O interface 168 receives the present position signal 116 from the position sensor 103 (or 102), the desired position signal 120, and in some embodiments also a present or desired depth signal D from the depth control arrangement 82 of the disk 10. In the embodiment shown in FIG. 6, the desired depth control signal 120 is illustrated as being received from the touchscreen 101.

The processor 156 may take any appropriate from, including a microprocessor or CPU module or arrangement. The upstream I/O interface 168 provides a mechanism for conveying real-time information from the processor 156 controller 100 to an operator in the cab of the tractor towing the disk 10, and for receiving real-time information from the position sensor 103, from an operator in the cab, or from the depth control arrangement 82, and converting that information into electrical signals that are usable by the processor 156.

The upstream I/O interface 168 may, for example, provide a signal to the touchscreen 101 that allows the touchscreen 101 to visually display values of present and desired depth, or control options for one or more actively-damped stabilizer wheel arrangements 12 that are operatively connected to be controlled by the controller 100.

The data storage device 170 may be any appropriate form of volatile or non-volatile magnetic or solid-state storage device for receiving and exchanging pre-programmed data, and/or an updateable control program for positioning and controlling the stabilizer wheel arrangement 12, in an internal memory structure of the storage device 170. The internal memory structure of the storage device 170 may be a non-volatile memory array such as Flash memory, for example.

The output signal conditioning interface is configured to provide any post-processing required to modify the cylinder control signal 118 before it is sent to the solenoid 133 of the solenoid-operated proportional control valve 124 of the electro-hydraulic control arrangement 104.

From the foregoing description, it will be appreciated that the controller 100 and the position sensor 103 (or 102) are operatively connected and configured to form a proportional negative feedback control arrangement for determining a present difference ΔP between the desired position PD (120) and present position PP (78) of the stabilizer wheel 46, and adjusting the flow of hydraulic fluid to and from the rod and cylinder ends 72,74 of the bore 68 of the cylinder 42 in proportion to the determined present difference ΔP between the desired and present positions PD,PP of the stabilizer wheel 42.

Figure 8:
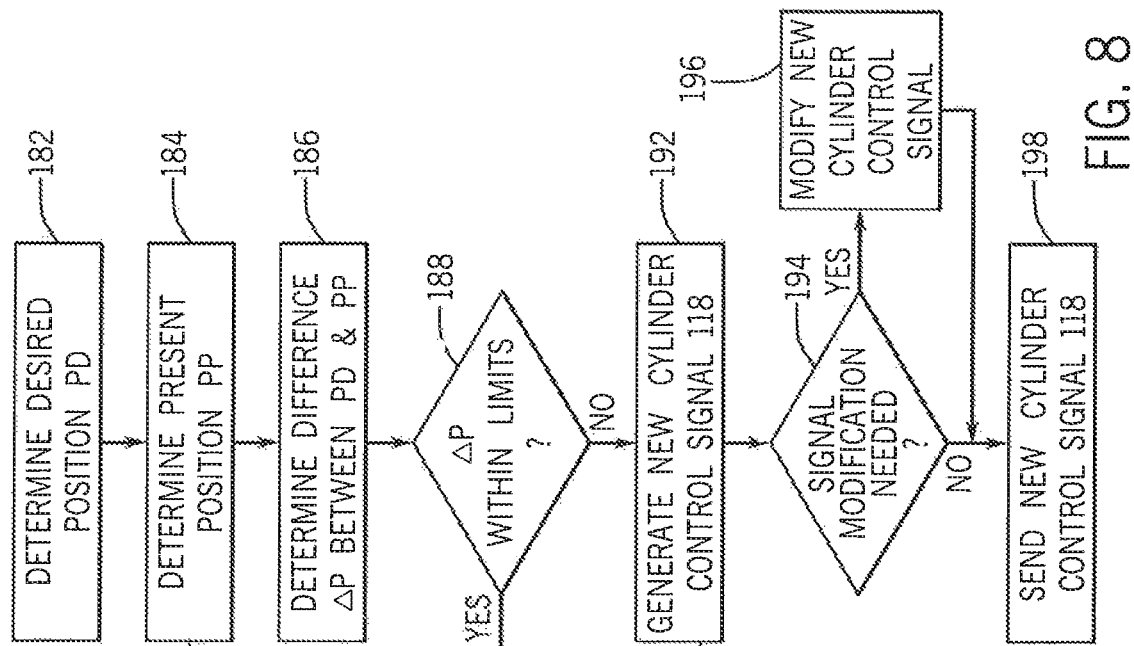
FIG. 8 is a flow diagram illustrating a method for operating an actively-damped remotely controllable stabilizer wheel arrangement, in accordance with an exemplary embodiment of the present invention.

FIG. 8 illustrates a process used by the exemplary embodiment of the remotely positionable stabilizer wheel arrangement 12 for commanding the proportional control valve 124 to simultaneously, cooperatively and proportionally adjust the flow of pressurized hydraulic fluid to and from both the rod and base ends 72,74 of the bore 68 of the hydraulic cylinder 42, to thereby cause the hydraulic cylinder 42 to move the stabilizer wheel 46 to, and hold the stabilizer wheel 46 at the desired stabilizer wheel position PD.

As shown at block 182 the process 180 begins with the controller 100 receiving the desired position signal 120 from the touchscreen 101, or the desired depth signal D from the depth control arrangement 82, and determining the desired position PD. As shown at block 184, the controller 100 then determines the present position PP from the present position signal 116 generated by the position sensor 103 (or 102).

The processor 156 then compares the present position PP to the desired position PD, and then determines the difference ΔP between the desired and present positions PD,PP, as shown at block 186. As shown at decision block 188, the processor 156 then determines whether the determined difference ΔP in desired and present position PD,PP falls within acceptable limits.

As shown in FIG. 8, if the difference ΔP between the desired and present positions PD,PP is within acceptable limits, the wheel positioning process 180 moves to an active damping process, as represented by decision block 203 and described in detail below with reference to FIG. 11.

As further shown in FIG. 8, if the active damping process 203 determines that no active damping is presently required, and the difference ΔP between the desired and present positions PD,PP is within acceptable limits as previously determined at block 188 of the wheel positioning process 180, the previous value of the cylinder control signal 118 is maintained, as shown at block 190, and the process 180 returns to block 184 and begins again.

If the difference ΔP between the desired and present positions PD,PP of the stabilizer wheel 46 is not within acceptable limits, the process 180 moves on to block 192 and the processor 156 determines a new value for the cylinder control signal 118 that will cause the proportional control valve 124 to simultaneously, cooperatively and proportionally adjust the flow of pressurized hydraulic fluid to and from both the rod and base ends 72,74 of the bore 68 of the hydraulic cylinder 42, to thereby cause the hydraulic cylinder 42 to move the stabilizer wheel 46 to, and hold the stabilizer wheel 46 at the desired stabilizer wheel position PD.

In various embodiments of the invention, the processor 156 may employ different methodologies for determining the new value for the cylinder control signal 118.

For example, in some embodiments, the processor 156 may be configured for determining the target position 160 of the piston 70 within the cylinder bore 68 by selecting a predetermined target position 160 for the piston 70 that corresponds to the desired stabilizer wheel position input PD from a table stored in the data storage device 170, and generating the new cylinder control signal 118 from the predetermined piston target position 160 selected from the table.

Alternatively, the processor 156 may be configured for computing a computed desired target position 160 for the piston 70 that corresponds to the desired stabilizer wheel position input PD by using a computation process stored in the data storage device 170, or programmed into the processor 156, and generating the new cylinder control signal 118 using the computed desired target position 160 for the piston 70.

In some embodiments of the invention, the processor 156 may be configured for making a recursive adjustment such as an incremental adjustment to a previously determined target position 160 for the piston 70 in the cylinder bore 68. This last option may be used, for example, if an operator of the towing vehicle wishes to modify the position 78 of the stabilizer wheel 46 on the basis of observation of the performance of the implement 10 during tillage operations.

For embodiments using the target position 160 of the piston 70, the processor 156 may also use the present position signal 161 as determined by the integral position sensor 103, to determine and utilize a difference ΔPP (delta piston position) between the target and present positions 160,161 of the piston 70 that is equivalent to the difference ΔP between the desired and present positions DP,PP for carrying out the steps of the process 180. The processor 156 may also be configured for generating the target and present positions 160,161 of the piston 70 using one or more look-up tables or computation processes in the manner described above, for embodiments of the invention that utilize another position sensing approach such as the sensor 102.

As indicated at blocks 194 and 196 of FIG. 8, for some embodiments of the invention it may be necessary to modify the new cylinder control signal 118 to compensate for various non-linearities in the control system, in order to achieve a desirably high degree of accuracy and precision in positioning and controlling the stabilizer wheel 46.

Figure 9:
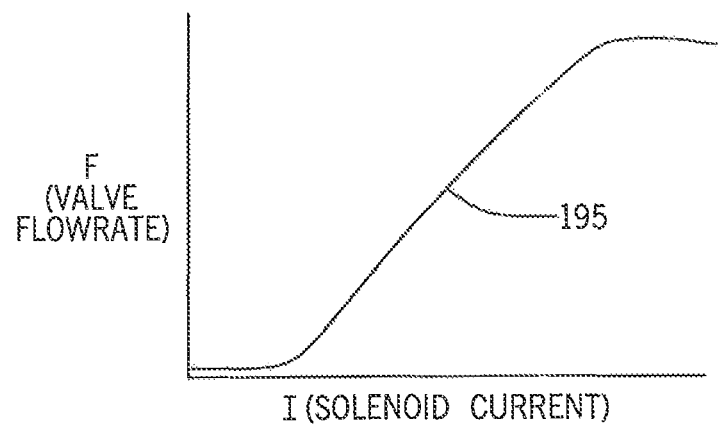
FIGS. 9 and 10 are graphs used to illustrate a methodology for dealing with non-linearities in control elements of an actively-damped remotely controllable stabilizer wheel arrangement, in accordance with an exemplary embodiment of the present invention.
Figure 10:
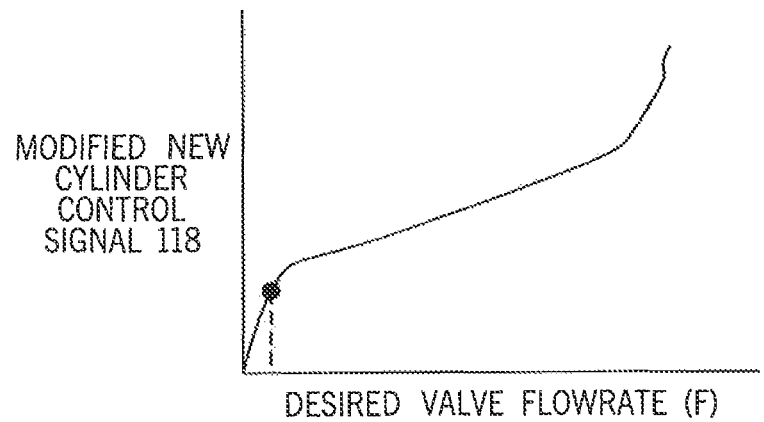

For example, as indicated in FIG. 9, some types of solenoid-operated proportional flow control valves 124 of the type potentially usable for practicing the invention exhibit an inherent non-linearity of flow rate (F) as a function of the current (I) applied by the cylinder control signal 118 to the solenoid 133 at high and low values of current I. To compensate for this inherent non-linearity, it may be necessary for the controller 100 to increase the current level I of the cylinder control signal 118 at low desired flow rates F, and to decrease the current level I of the cylinder control signal 118 at high desired flow rates F, in the manner illustrated in FIG. 10.

Returning to FIG. 8, the processor 156 of the exemplary embodiment is configured to check the new cylinder control signal 118 generated at block 192 to verify that the current level I of the new signal 118 falls within a substantially linear center section 195 of the curve shown in FIG. 9. If the current I corresponding to the new cylinder control signal 118 falls within the linear section 195 of the curve of FIG. 9, the process 180 continues to block 198 and the new cylinder control signal 118 determined at block 192 is sent to the electro-hydraulic control arrangement 104. If, however, the current I corresponding to the new cylinder control signal 118, as determined at block 192, falls outside of the linear section 195 of the curve of FIG. 9, the process 180 continues to block 196 and the new cylinder control signal 118 determined at block 192 is modified in the manner described above with reference to FIG. 10, before being sent to the electro-hydraulic control arrangement 104 as indicated at block 198.

The steps of blocks 194 and 196 may be carried out by the processor 100 and/or the output signal conditioning interface 172 using data stored in the data storage device 170, or computation processes programmed into the processor or controller 100 and/or the output signal conditioning interface 172.

The controller 100 of the exemplary embodiment is configured for continually repeating the method 180 and sampling the present difference ΔP between the target and present positions 160,161 of the piston 70 within the bore 68 of the cylinder 42 at a periodic rate, such as two thousand hertz, for example, and commanding the proportional control valve 124 to simultaneously and cooperatively adjust the flow of pressurized hydraulic fluid to and from both the rod and base ends 72,74 of the bore 68 of the hydraulic cylinder 42 at the periodic rate.

It will be appreciated that, by utilizing such a high repetition rate for sampling, in addition to the using the proportional control methodology described herein, a remotely positionable stabilizer wheel arrangement 12 according to the invention provides highly stable, accurate, precise and responsive position control of the position 78 of a stabilizer wheel 46 with respect to the frame 16 of an agricultural implement such as the disk 10.

Those having skill in the art will also appreciate that, through practice of the invention, the stabilizer wheel 46 can be remotely positioned, repositioned, and actively controlled with considerably greater accuracy and precision, and with improved functionality and performance of the stabilizer wheel 46, as compared to prior approaches for positioning such stabilizer wheels.

Specifically, the invention provides for controlling the position 78 of the stabilizer wheel 46 in increments on the order of one-tenth of an inch per each tap of an operator's finger on an incremental adjustment feature of the touchscreen 101. The invention also is sensitive enough to detect and respond to movements of the piston 70 away from the target position 160 on the order of fifty-thousandths of an inch, thereby resulting in highly accurate and precise control of the position 78 of the stabilizer wheel 46 with respect to the frame 16.

It will be further appreciated that the exemplary embodiment of the invention illustrates a method and apparatus for remotely controlling the positioning 78 of a stabilizer wheel 46 independently from the action of the depth control arrangement 82 in positioning the main transport and outer carrying wheels 22,22,23,23 of the disk 10. This allows the remotely adjustable stabilizer wheel arrangement 12 to compensate for the fact that the stabilizer wheel 46 will generally be in contact with an untilled area of the ground surface 80 ahead of the tillage tools 19,20, whereas the support wheels 22,22,23,23 will generally be riding on an area of the ground surface 80 that has been least partly tilled, and may therefore be at a different position 79, with respect to the frame 16 of the disk 10 than the position 78 of the stabilizer wheel 46, with respect to the frame 16, as the stabilizer wheel 46 rides upon the untilled area of the ground surface 80. The present invention allows precise, active control or the stabilizer wheel position 78 during operation of the disk 10 to compensate for this difference in height between the tilled and untilled areas of the ground surface.

Although the exemplary embodiments described herein and shown in the drawings are directed to an embodiment of a disk 10 including two actively-damped remotely positionable stabilizer wheel arrangements 12,12 in which the second end 32 of the support strut 28 and support bracket 24 are configured for slidable engagement of the support strut 28 with the support bracket 24, and the position sensor 102 is operatively connected for indicating a present linear position of the strut 28 with respect to the strut bracket 24, those having skill in the art will appreciate that, in other embodiments of the invention other configurations and connections of the components may be utilized with efficacy. For example, in other embodiments the strut 28 may be pivotably connected to the support strut bracket 24, and the present position of the strut 28 and/or stabilizer wheel 46 may be detected by other types of position sensing apparatus or methods.

As previously stated and shown in FIGS. 4-6, the exemplary embodiments of the actively-damped remotely positionable stabilizer wheel arrangements 12,12 also each include a vibration sensor 200 attached to the stabilizer wheel support strut 28 of the stabilizer wheel positioning arrangement 29. These vibration sensors 200 may take a variety of forms in various embodiments of the invention, such as an accelerometer, an IMU (inertia measurement unit), a strain gage or a load cell.

The exemplary embodiment of the vibration sensor 200 shown in FIGS. 4-6 is an accelerometer that is fixedly attached to the lower end of the wheel support strut 28, adjacent the rolling axis 47 of the stabilizer wheel 46. The vibration sensor 200 is configured and operatively connected to the controller 100 for detecting a present ground-induced vibration of the stabilizer wheel 46, and for generating an electrical present vibration signal 202 that is indicative of the present vibration of the stabilizer wheel 46.

Figure 11:
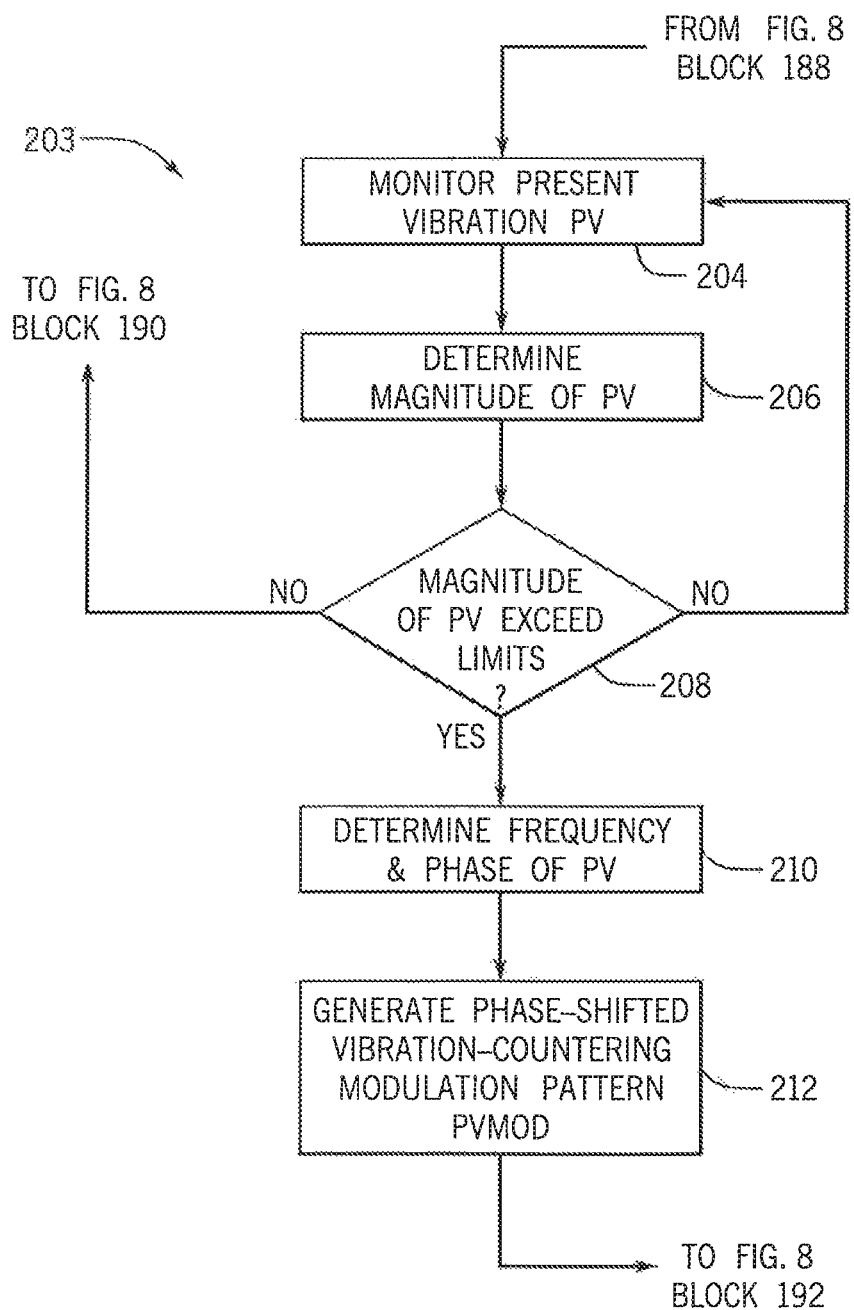
FIG. 11 is a flow diagram illustrating a method for actively damping a remotely controllable stabilizer wheel arrangement, in accordance with an exemplary embodiment of the present invention.

The controller 100 is configured for monitoring the present vibration signal 202, detecting an onset of the ground-induced vibration in the stabilizer wheel 46, and introducing a phase-shifted vibration-countering or vibration cancelling/damping modulation into the cylinder control signal 118, to thereby reduce the ground-induced vibration of the stabilizer wheel 46, using an active damping process 203, as shown in FIG. 11, within the wheel positioning process 180 shown in FIG. 8.

FIG. 11 shows an expanded flow diagram for the active damping process used in the exemplary embodiments of the actively-damper remotely controllable stabilizer wheel arrangements 12,12 for monitoring and dealing with an undesirable level of ground-induced vibration.

As shown at block 204 of FIG. 11, the processor 156 of the controller 100 is configured to generate a time-based record of the present vibration PV (see FIG. 12) from the present vibration signal 202 generated by the vibration sensor 200, and to determine a present magnitude of the present vibration PV, as shown at block 206 of FIG. 11. As shown at decision block 208, the processor 156 then determines whether or not the present magnitude of the present vibration PV exceeds acceptable limits 205,207 (see FIG. 12). The limits may be stored as a predetermined values in the data storage device 170, or take other forms such as: a value programmed into the processor 156 or the upstream I/O interface 168; a look-up table stored in the data storage device 170 as a function of other parameters such as ground speed, operating mode of the implement, or duration of the vibration; a calculation process in the processor 156; a value entered manually by an operator through the touchscreen 104; or a recursive adjustment such as an incremental change to a previous limit value.

If the magnitude of the present vibration PV does not exceed the acceptable limits 205,207, the active damping process 203 shown in FIG. 11 returns to block 190 of the position determining process 180 shown in FIG. 8 and the present cylinder control signal 118 is maintained. As further indicated at block 208 of FIG. 11, if the magnitude of the present vibration PV does not exceed the acceptable limits 205,207, the active damping process 203 also continues to monitor and evaluate the present level of ground-induced vibration PV being imposed on the stabilizer wheel 46, in accordance with blocks 201,206,208 of the active damping process, to identify the onset of a level of ground-induced vibration that exceeds the acceptable limits 205,207.

If it is determined at block 208 that the magnitude of the present vibration PV does exceed the acceptable limits 205,207, the active damping process 203 shown in FIG. 11 moves sequentially through blocks 210 and 212 to generate a modulation pattern PVMOD that is returned to block 192 of the positioning process 180 shown in FIG. 8 for use in generating a new cylinder control signal 118.

Figure 12:
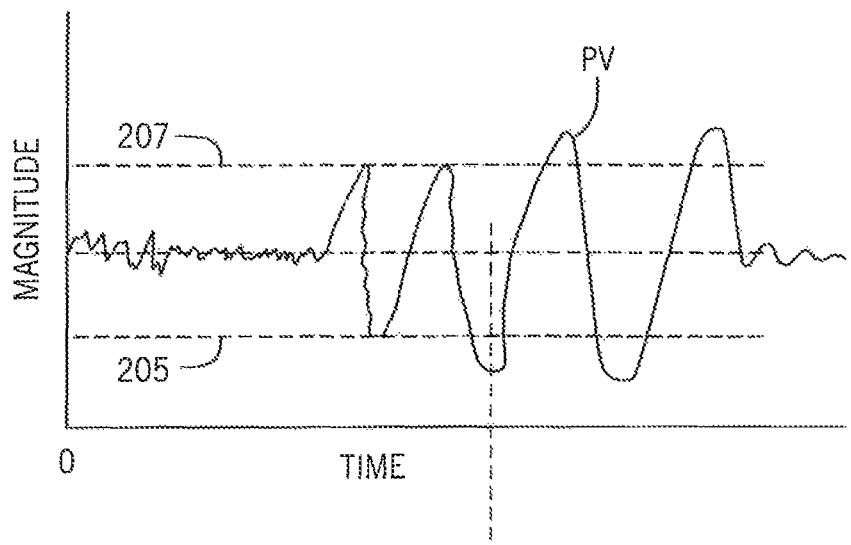
FIGS. 12 and 13 are graphs respectively illustrating exemplary depictions of a detected ground-induced vibration pattern and a corresponding vibration-countering or vibration cancelling/damping modulation signal, as generated by an exemplary embodiment of the invention, corresponding to the detected ground-induced vibration pattern.
Figure 13:
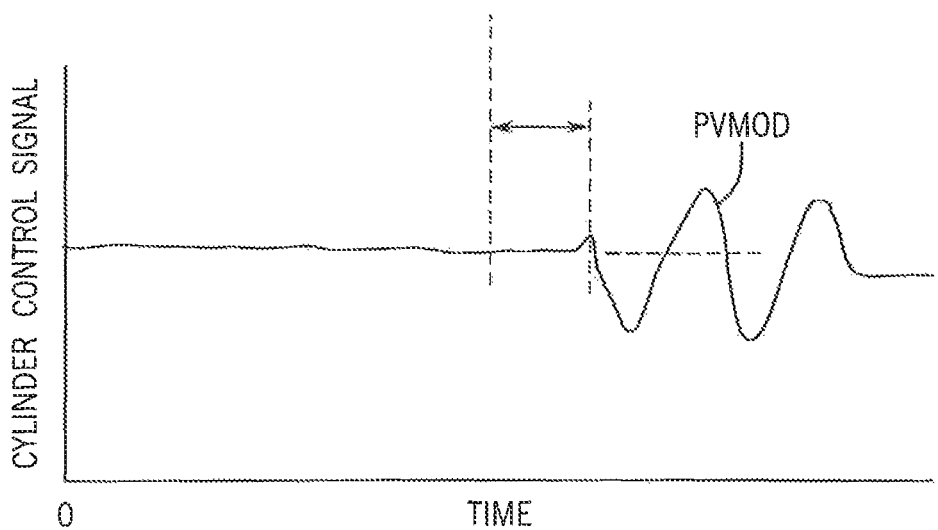

Specifically, as shown in FIG. 11, if it is determined at block 208 that active damping is required, the processor 156 determines the frequency and phase of the present vibration PV, as illustrated in FIG. 12. The active damping process 203 then moves to block 212, where the processor 156 generates a phase-shifted vibration-countering or vibration cancelling/damping modulation pattern PVMOD corresponding to the frequency, phase and magnitude of the present vibration PV. The active damping process 203 then returns the modulation pattern PVMOD to block 192 of the positioning process 180 of FIG. 8, for generation of a new cylinder control signal 118 that includes the modulation pattern PVMOD.

As shown in FIG. 8, the new cylinder control signal 118 including the modulation pattern PVMOD may then be modified, as indicated at blocks 194 and 196, if required, before being sent on at block 198 to the solenoid-controlled flow control valve 124 for controlling the hydraulic cylinder 42 in a manner that actively damps the ground-induced vibration of the stabilizer wheel 46.

As previously noted above in relation to the wheel positioning process 180, the controller 100 of the exemplary embodiment is configured for continually repeating the method 180, and the active damping process 203 at a rapid periodic rate, such as two thousand hertz, for example, and commanding the proportional control valve 124 to simultaneously and cooperatively adjust the flow of pressurized hydraulic fluid to and from both the rod and base ends 72,74 of the bore 68 of the hydraulic cylinder 42 at the periodic rate.

It will be appreciated that, by utilizing such a high repetition rate for sampling, in addition to the using the proportional control methodology described herein, an actively damped remotely positionable stabilizer wheel arrangement 12 according to the invention provides a highly stable, accurate, precise and responsive apparatus and method for positioning and actively damping ground-induced vibration of a stabilizer wheel 46 of an agricultural implement such as the disk 10.

In various embodiments of the invention, the processor 156 may employ different methodologies for generating the phase-shifted vibration-countering or cancelling/damping modulation pattern PVMOD.

For example, in some embodiments, the processor 156 may be configured for selecting a predetermined modulating pattern corresponding to the frequency, phase and magnitude of the ground-induced vibration from a table stored in the data storage device 170, and for generating the modulation pattern PVMOD from the predetermined pattern selected from the table.

Alternatively, the processor 156 may be configured for computing a modulating pattern PVMOD corresponding to the frequency, phase and magnitude of the present ground-induced vibration PV by using a computation process that is stored in the data storage device 170 or programmed into the processor 156. This may include the controller identifying a dynamic model of the unwanted ground-induced vibration and using the model to generate the canceling dynamic movement or pattern that is opposite or 180-degrees phase-shifted to cancel or damp the unwanted ground-induced vibration. The controller may then recursively update the model in a manner that is adaptive to the unwanted ground-induced vibration. In one example, the controller may determine the dynamic model for the ground-induced vibration and compare the present magnitude of the ground-induced vibration to a desired maximum allowable value. The controller may correspondingly use the model to establish a vibration-canceling dynamic modulation pattern and provide a cylinder control signal to introduce the vibration-canceling dynamic modulation pattern to cancel the frequency, phase, and magnitude of the ground-induced vibration. This could be implemented as an identified FIR (finite impulse response) model to cancel/damp/smooth ground induced vibration(s), essentially for all frequencies. Regardless of the particular control methodology implemented through controller 100, the system need not create perfectly matched, fully-canceling, responses. Instead, the controller 100 may be configured to create a damping response that is sufficient to prevent building vibrations to an extent that would induce harmonics. Exemplary ways of achieving such controls may include identifying which harmonic to cancel and using, for example, a band pass filter to determine the magnitude and phase and then apply a counter measure by phase shifting.

In some embodiments of the invention, the processor 156 may be configured for making an incremental and/or recursive adjustment to a previously generated modulating pattern PVMOD. This last option may be used, for example, if an operator of the towing vehicle wishes to modify the degree of active damping applied on the basis of observation of the performance of the implement 10 during tillage operations.

From the foregoing, it will be appreciated by those having skill in the art that the invention provides significant improvements in positioning and damping ground-induced vibration of a remotely positionable stabilizer wheel 46 of an agricultural implement such as the disk 10. It will be understood that the wheel positioning and active vibration damping aspects of the invention can be used separately from one another, but that the invention provides significant synergistic advantage when the wheel positioning and active vibration damping aspects of the invention are used together.

It will be particularly appreciated that the invention provides an apparatus and method for incorporating active vibration damping into a remotely positionable stabilizer wheel arrangement for an implement using an elegantly simple approach that required virtually no additional structural complexity beyond adding the vibration sensor.

In addition, although the exemplary embodiments described above have utilized a solely proportional control methodology, it will be understood that the invention is not limited to the use of a "proportional only" control methodology. Other embodiments of the invention may use integral and/or differential control methodologies in addition to proportional control. It will be appreciated by those having skill in the art, however, that the combination of various aspects of the invention as described above with reference to the exemplary embodiments has been shown to provide a sufficiently high degree of accuracy, precision and responsiveness in the desired application without the necessity for incorporating more complex control methodologies.

It is further anticipated that the present invention may also be practiced with efficacy using simple flow or pressure control arrangements.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may be apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but that it is intended to include all changes and modifications that are within the scope and spirit of the invention.

What is claimed is:

1. An actively damped remotely positionable stabilizer wheel arrangement for an agricultural tillage implement having an implement frame supported above a ground surface by implement support wheels operatively connected to the frame by a depth control arrangement, the stabilizer wheel arrangement comprising:

a support strut coupled to the frame, the support strut including a first end and a second end;

a stabilizer wheel mounted on the first end of the support strut such that the stabilizer wheel rolls about a horizontal rotational axis along the ground surface when in contact with the ground surface;

a stabilizer wheel positioning arrangement adapted for operatively connecting the stabilizer wheel to the frame, the stabilizer wheel positioning arrangement including a double-acting hydraulic cylinder and being configured for adjusting engagement of the stabilizer wheel with the ground surface through action of the double-acting hydraulic cylinder;

a flow control arrangement operatively connected in fluid communication with the double-acting hydraulic cylinder, adapted for receiving a cylinder control electrical signal, and further adapted for operative connection in fluid communication with a source of pressurized hydraulic fluid for receiving a flow of pressurized hydraulic fluid from the source;

a position sensor configured and operatively connected for indicating a present position of the stabilizer wheel with respect to the frame, and generating an electrical present position signal indicative of the present stabilizer wheel position with respect to the frame;

a vibration sensor attached to the support strut such that the vibration sensor is configured and operatively connected for indicating a present ground-induced vibration of the stabilizer wheel as the stabilizer wheel rolls along the ground surface when in contact with the ground surface, and generating an electrical present vibration signal indicative of the vibration of the stabilizer wheel; and an electrical controller adapted for receiving an input signal indicating a desired position of the stabilizer wheel with respect to the frame, the controller also being operatively connected to the position sensor, the vibration sensor and the flow control arrangement;

the double-acting hydraulic cylinder of the stabilizer wheel positioning arrangement having an internal bore divided by a piston into a base end and a rod end of the internal bore, the double-acting hydraulic cylinder also having first and second ends thereof operatively attached within the stabilizer wheel positioning arrangement for extension and retraction of the stabilizer wheel positioning arrangement with respect to the frame by corresponding movement of the piston within the internal bore of the double-acting hydraulic cylinder to thereby position the stabilizer wheel with respect to the frame;

the flow control arrangement configured to control extension and retraction of the stabilizer wheel positioning arrangement with respect to the frame in accordance with the cylinder control signal;

the controller being operatively connected to the flow control arrangement, and configured for generating and providing the cylinder control signal to the flow control arrangement in response to the present position signal and the desired wheel position signal, to thereby cause the double-acting hydraulic cylinder to move the stabilizer wheel to and hold the stabilizer wheel at the desired stabilizer wheel position by controlling the flow of pressurized hydraulic fluid to and from both the rod and base ends of the internal bore of the double-acting hydraulic cylinder;

the controller being further configured for monitoring the present, vibration signal as the stabilizer wheel rolls along the ground surface when in contact with the ground surface, detecting an onset of the ground-induced vibration in the stabilizer wheel, determining a present magnitude of the ground-induced vibration, comparing the present magnitude of ground-induced vibration to a desired maximum allowable magnitude of the ground-induced vibration, and introducing a phase-shifted vibration-countering or cancelling/damping modulation into the cylinder control signal whenever the present magnitude of the ground-induced vibration exceeds the maximum allowable magnitude of ground-induced vibration to thereby reduce the ground-induced vibration of the stabilizer wheel; wherein:

the controller is configured for simultaneously, actively and proportionally controlling the flow of pressurized hydraulic fluid from the flow control arrangement to and from both the rod and base ends of the internal bore of the double-acting hydraulic cylinder;

the controller and position sensor are operatively connected and configured to form a proportional negative feedback control arrangement for determining a present difference between the desired and present positions of the stabilizer wheel and adjusting the flow of hydraulic fluid to and from the rod and cylinder ends of the internal bore of the double-acting hydraulic cylinder in proportion to the determined present difference between the desired and present positions of the stabilizer wheel;

the position sensor is further operatively connected for indicating a present position of the piston within the internal bore of the double-acting hydraulic cylinder that corresponds to a present position of the stabilizer wheel with respect to the frame, the position sensor also being configured for generating an electrical signal indicative of the present position of the piston within the internal bore of the double-actinghydraulic cylinder;

the controller is configured for determining a target position of the piston within the internal bore of the double-acting hydraulic cylinder corresponding to the desired wheel position input signal, and for determining a present difference between the target and present positions of the piston within the internal bore of the double-acting hydraulic cylinder and adjustin the flow of hydraulic fluid to and from the rod and cylinder ends of the internal bore of the double-acting hydraulic cylinder in proportion to the determined present difference between the target and present positions of the piston in the internal bore of the double-actinghydraulic cylinder to move and hold the piston at the target position for the piston within the internal bore of the double-acting hydraulic cylinder; and the controller is configured to repetitively sample the present difference between the target and present positions of the piston within the internal bore of the double-acting hydraulic cylinder at a periodic rate, and to command the proportional control valve to simultaneously and cooperativel adjust the flow of pressurized hydraulic fluid to and from both the rod and base ends of the internal bore of the double-acting hydraulic cylinder at the periodic rate.

2. The stabilizer wheel arrangement of claim 1, wherein:
the stabilizer wheel positioning arrangement includes a support strut bracket;
the second end of the support strut is adapted for sliding engagement with the support strut bracket;
the support strut bracket is adapted for attachment to the implement frame and for operative sliding engagement with the second end of the support strut for operatively connecting the support strut to the frame; and the double-acting hydraulic cylinder has a first end thereof operatively attached to the support strut, and a second end thereof operatively attached to the support strut bracket for extension and retraction of the strut with respect to the strut bracket by corresponding extension and retraction of the double-acting hydraulic cylinder to thereby lower and raise the stabilizer wheel in to and out of contact with the ground surface.

3. The stabilizer wheel arrangement of claim 1, wherein the vibration sensor includes at least one of: an accelerometer; an inertia measurement unit; a strain gage; and/or a load cell.

4. The stabilizer wheel arrangement of claim 1, wherein the controller is configured for generating the phase-shifted vibration-countering or cancelling/damping modulation pattern by a process including at least one step from the group of the steps consisting of:

selecting a predetermined modulating pattern corresponding to the frequency, phase and magnitude of the ground-induced vibration;

computing a modulating pattern corresponding to the frequency, phase and magnitude of the ground-induced vibration; and making a recursive adjustment to a previously generated modulating pattern corresponding to the frequency, phase and magnitude of the ground-induced vibration.

5. An agricultural tillage implement having an implement frame supported above a ground surface by implement support wheels operatively connected to the frame by a depth control arrangement, the implement further having at least one actively damped remotely positionable stabilizer wheel arrangement attached to the frame, the at least one actively damped remotely positionable stabilizer wheel arrangement comprising:

a support strut coupled to the frame, the support strut including a first end and a second end;

a stabilizer wheel mounted on the first end of the support strut such that the stabilizer wheel rolls about a horizontal rotational axis along the ground surface when in contact with the ground surface;

a stabilizer wheel positioning arrangement adapted for operatively connecting the stabilizer wheel to the frame, the stabilizer wheel positioning arrangement including a double-acting hydraulic cylinder and being configured for adjusting engagement of the stabilizer wheel with the ground surface through action of the double-acting hydraulic cylinder;

a flow control arrangement operatively connected in fluid communication with the double-acting hydraulic cylinder, adapted for receiving a cylinder control electrical signal, and further adapted for operative connection in fluid communication with a source of pressurized hydraulic fluid for receiving a flow of pressurized hydraulic fluid from the source;

a position sensor configured and operatively connected for indicating a present position of the stabilizer wheel with respect to the frame, and generating an electrical present position signal indicative of the present stabilizer wheel position with respect to the frame;

a vibration sensor attached to the support strut such that the vibration sensor is configured and operatively connected for indicating a present ground-induced vibration of the stabilizer wheel as the stabilizer wheel rolls along the ground surface when in contact with the ground surface, and generating an electrical present vibration signal indicative of the vibration of the stabilizer wheel; and an electrical controller adapted for receiving an input signal indicating a desired position of the stabilizer wheel with respect to the frame, the controller also being operatively connected to the position sensor, the vibration sensor and the flow control arrangement;

the double-acting hydraulic cylinder of the stabilizer wheel positioning arrangement having an internal bore divided by a piston into a base end and a rod end of the internal bore, the double-acting hydraulic cylinder also having first and second ends thereof operatively attached within the stabilizer wheel positioning arrangement for extension and retraction of the stabilizer wheel positioning arrangement with respect to the frame by corresponding movement of the piston within the internal bore of the double-acting hydraulic cylinder to thereby position the stabilizer wheel with respect to the frame;

the flow control arrangement configured for controlling the flow of hydraulic fluid to and from both the rod and base ends of the internal bore of the double-acting hydraulic cylinder, to thereby control extension and retraction of the stabilizer wheel positioning arrangement with respect to the frame in accordance with the cylinder control signal;

the controller being operatively connected to the flow control arrangement, and configured for generating and providing the cylinder control signal to the flow control arrangement in response to the present position signal and the desired wheel position signal, to thereby cause the double-acting hydraulic cylinder to move the stabilizer wheel to and hold the stabilizer wheel at the desired stabilizer wheel position by controlling the flow of pressurized hydraulic fluid to and from both the rod and base ends of the internal bore of the double-acting hydraulic cylinder;

the controller being further configured for monitoring the present vibration signal as the stabilizer wheel rolls along the ground surface when in contact with the ground surface, detecting an onset of the ground-induced vibration in the stabilizer wheel, determining a present magnitude of the ground-induced vibration, comparing the present magnitude of ground-induced vibration to a desired maximum allowable magnitude of the ground-induced vibration, and introducing a phase-shifted vibration-countering or cancelling/damping modulation into the cylinder control signal whenever the present magnitude of the ground-induced vibration exceeds the maximum allowable magnitude of ground-induced vibration to thereby reduce the ground-induced vibration of the stabilizer wheel; wherein:

the controller is configured for simultaneously, actively and proportionally controlling the flow of pressurized hydraulic fluid from the flow control arrangement to and from both the rod and base ends of the internal bore of the double-acting hydraulic cylinder;

the controller and position sensor are operatively connected and configured to form a proportional negative feedback control arrangement for determining a present difference between the desired and present positions of the stabilizer wheel and adjusting the flow of hydraulic fluid to and from the rod and cylinder ends of the internal bore of the double-acting hydraulic cylinder in proportion to the determined present difference between the desired and present positions of the stabilizer wheel;

the position sensor is further operatively connected for indicating a present position of the piston within the internal bore of the double-acting hydraulic cylinder that corresponds to a present position of the stabilizer wheel with respect to the frame, the position sensor also being configured for generating an electrical signal indicative of the present position of the piston within the internal bore of the double-acting hydraulic cylinder;

the controller is configured for determining a target position of the piston within the internal bore of the double-acting hydraulic cylinder corresponding to the desired wheel position input signal, and for determining a present difference between the target and present positions of the piston within the internal bore of the double-acting hydraulic cylinder and adjusting the flow of hydraulic fluid to and from the rod and cylinder ends of the internal bore of the double-acting hydraulic cylinder in proportion to the determined present difference between the target and present positions of the piston in the internal bore of the double-acting hydraulic cylinder to move and hold the piston at the target position for the piston within the internal bore of the double-acting hydraulic cylinder; and the controller is configured to repetitively sample the present difference between the target and present positions of the piston within the internal bore of the double-acting hydraulic cylinder at a periodic rate, and to command the proportional control valve to simultaneously and cooperatively adjust the flow of pressurized hydraulic fluid to and from both the rod and base ends of the internal bore of the double-acting hydraulic cylinder at the periodic rate.

6. The agricultural tillage implement of claim 5, wherein:
the stabilizer wheel positioning arrangement includes a support strut bracket;
second end of the support strut is adapted for sliding engagement with the support strut bracket;
the support strut bracket is adapted for attachment to the implement frame and for operative sliding engagement with the second end of the support strut for operatively connecting the support strut to the frame; and
the double-acting hydraulic cylinder has a first end thereof operatively attached to the support strut, and a second end thereof operatively attached to the support strut bracket for extension and retraction of the strut with respect to the strut bracket by corresponding extension and retraction of the double-acting hydraulic cylinder to thereby lower and raise the stabilizer wheel in to and out of contact with the ground surface.

7. The agricultural tillage implement of claim 5, wherein the vibration sensor is a device includes at least one of: an accelerometer; an inertia measurement unit; a strain gage; and/or a load cell.

8. The agricultural tillage implement of claim 5, wherein the controller is further configured for determining a frequency and phase of the ground-induced vibration, and for generating the phase-shifted vibration-countering or cancelling/damping modulation pattern in response to the frequency, phase and magnitude of the around-induced vibration.

9. The agricultural tillage implement of claim 8, wherein the controller is configured for generating the phase-shifted vibration-countering or cancelling/damping modulation pattern by a process including at least one step from the group of the steps consisting of:
- selecting a predetermined modulating pattern corresponding to the frequency, phase and magnitude of the ground-induced vibration;
- computing a modulating pattern corresponding to the frequency, phase and magnitude of the ground-induced vibration; and
- making a recursive adjustment to a previously generated modulating pattern corresponding to the frequency, phase and magnitude of the ground-induced vibration.

\* \* \* \* \*